United States Patent
Yamamoto et al.

[11] Patent Number: 6,100,622
[45] Date of Patent: Aug. 8, 2000

[54] DRIVING APPARATUS OF VIBRATION TYPE ACTUATOR

[75] Inventors: Shinji Yamamoto, Yokohama; Akio Atsuta, Yokosuka; Kenichi Kataoka, Yokohama; Tadashi Hayashi, Yokohama; Jun Ito, Yokohama, all of Japan

[73] Assignee: Canon Kabushiki Kaisha, Tokyo, Japan

[21] Appl. No.: 09/206,703

[22] Filed: Dec. 7, 1998

[30] Foreign Application Priority Data

Dec. 12, 1997 [JP] Japan ................... 9-343454
Dec. 12, 1997 [JP] Japan ................... 9-343458

[51] Int. Cl.$^7$ .................................................. H02N 2/14
[52] U.S. Cl. ........................................................ 310/316.01
[58] Field of Search ........................... 310/316.01, 316.02

[56] References Cited

U.S. PATENT DOCUMENTS

| | | | |
|---|---|---|---|
| 4,692,649 | 9/1987 | Izukawa | 310/316 |
| 5,001,404 | 3/1991 | Kataoka | 318/116 |
| 5,004,964 | 4/1991 | Kataoka | 318/128 |
| 5,157,300 | 10/1992 | Kataoka | 310/323 |
| 5,247,221 | 9/1993 | Atsuta | 310/323 |
| 5,285,134 | 2/1994 | Kataoka | 318/116 |
| 5,436,521 | 7/1995 | Kataoka | 310/317 |
| 5,459,370 | 10/1995 | Kataoka | 310/317 |
| 5,539,268 | 7/1996 | Kataoka | 310/316 |
| 5,545,954 | 8/1996 | Furukoshi | 310/316 |
| 5,612,598 | 3/1997 | Fukui et al. | 318/116 |
| 5,631,516 | 5/1997 | Kataoka | 310/316 |
| 5,656,881 | 8/1997 | Atsuta | 310/316 |
| 5,714,831 | 2/1998 | Walker et al. | 310/316 |
| 5,739,621 | 4/1998 | Atsuta et al. | 310/316 |
| 5,794,078 | 8/1998 | Okazaki | 396/50 |
| 5,889,350 | 3/1999 | Yamamoto | 310/316 |

FOREIGN PATENT DOCUMENTS 7-131987  5/1995  Japan ................. H02N 2/00

*Primary Examiner*—Thomas M. Dougherty
*Attorney, Agent, or Firm*—Fitzpatrick, Cella, Harper & Scinto

[57] ABSTRACT

A control apparatus for a vibration type actuator includes a first integral means for integrating a difference between a detected driving speed state of the actuator and a target speed state of the actuator, and a second integral means for integrating the integral value of the first integral means, where a drive operation of the actuator is controlled with a periodic signal varied in accordance with the sum of the integral values of the first and second integral means, thereby accurately controlling the target speed and position of a moving member driven by the actuator.

33 Claims, 24 Drawing Sheets

DRIVING APPARATUS OF VIBRATION TYPE ACTUATOR

BACKGROUND OF THE INVENTION

1. Field of the Invention

The present invention relates to a driving apparatus of a vibration type actuator such as a vibration type motor for applying a driving force using a vibration energy generated on a vibration member by applying an alternating signal to an electro-mechanical energy conversion element, and a device and image forming apparatus using the vibration type actuator and, more particularly, to an apparatus using the vibration type actuator for driving a member which requires high rotational speed precision in an electrophotographic image forming apparatus, such as a photosensitive drum serving as an image carrier in a copying machine.

2. Related Background Art

Conventionally, the speed of a vibration type actuator, particularly, a vibration type motor is controlled by proportional plus integral control or integral control, like other motors.

For example, in Japanese Patent Application Laid-Open No. 7-131987, as shown in FIG. 5, AC voltages, as alternating signals whose phases are shifted by 90° by a 90 degree phase shifter 40, are applied from input power amplifiers 39 and 41 via matching coils 42 and 45 and driving electrodes 43 and 46 to a piezoelectric element 56 constituting a vibration member having two phases of a driving portion. One and the other driving signals are also used to detect a vibration state. The sum of the two signals is input to one input terminal of a differential amplifier 50 via capacitances 44 and 47, while a signal (ground voltage) from the output terminal of the piezoelectric element 56 is input to the other input terminal of the differential amplifier 50. The differential amplifier 50 outputs rotational speed information. The output from the differential amplifier 50 is input to one input terminal of another differential amplifier 52 via a rectifier 51, whereas a target speed value from a target speed setting means 53 is input to the other input terminal of the differential amplifier 52. The differential amplifier 52 inputs a speed difference to an integrator 55.

An adder 54 adds the difference value from the differential amplifier 52 and the integral value from the integrator 55 to adjust the driving frequency of the vibration type motor output from a voltage control oscillator 38 using the sum, thereby controlling the speed.

When a vibration type motor is used to drive the photosensitive drum of a copying machine, the printing precision is influenced by errors in moving distance, i.e., rotational angle of the surface of the photosensitive drum. In this prior art, if the speed varies due to disturbance or the like, the steady-state error ($\Delta v$) of the speed can be finally eliminated as for the speed deviation, as shown in FIG. 4A, but the steady-state error ($\Delta x$) of the dimension at a position obtained by integral of the speed cannot be eliminated, as shown in FIG. 4B. That is, a position shift caused by variations in speed cannot be corrected (upon variations in speed during movement between two points,. a target position cannot be attained within a predetermined time even if the speed returns to a target speed). As a result, high-quality printing cannot be performed.

More specifically, in single-color copying, a toner image on the photosensitive drum to be transferred onto a transfer member at a transfer position cannot be transferred at a correct position on the transfer member.

In color copying, when photosensitive drums carrying toner images of respective colors (four colors) are arranged in parallel, toner images transferred at different positions on a transfer member cause color misregistration.

Further, in the above prior art, proportional plus integral control is performed in analog thereby failing to provide high-precision control.

SUMMARY OF THE INVENTION

One aspect of the application is to provide a driving apparatus of a vibration type actuator which can eliminate the steady-state error of the position by using a simple arrangement and a high-speed response characteristics of a vibration type motor.

One aspect of the application is to provide a driving apparatus of a vibration type actuator which can eliminate the steady-state errors of speed and position by using a simple arrangement and a high-speed response characteristics of a vibration type motor.

One aspect of the application is to provide an apparatus having a vibration type actuator which can drive a member to be driven without any steady-state errors of the speed and position.

One aspect of the application is to provide an image forming apparatus capable of obtaining a high-quality image when a photosensitive drum and the like are driven using the vibration type actuator as a driving source.

One aspect of the application is to provide a vibration type actuator for applying a periodic signal to an electro-mechanical energy conversion element to excite a vibration member, thereby obtaining a driving force, comprising detection means for detecting a driving state of the vibration type actuator, calculation means for calculating a difference between the driving state obtained from the detection means and a predetermined state, first integral means for integrating the value obtained from the calculation means, and second integral means for integrating a value obtained from the first integral means, wherein an energy amount supplied to the electro-mechanical energy conversion element is adjusted in accordance with at least a value output from the second integral means.

One aspect of the application is to provide a driving apparatus of a vibration type actuator capable of controlling the speed, acceleration, position, and vibration state of the vibration type actuator by proportional integral process at high speeds with high precision.

One aspect of the application is to provide a driving apparatus of a vibration type actuator for applying a periodic signal to an electro-mechanical energy conversion element to excite a vibration member, thereby obtaining a driving force, comprising detection means for detecting a driving state of the vibration type actuator, calculation means for calculating a difference between the driving state obtained from the detection means and a predetermined state, first integrating means for integrating a value output from the calculation means at a first timing, second integrating means which integrates the value output from the calculation means at a second timing, and has an integrating value reset every predetermined number of integrating operations, a register for holding the integrating value of the second integrating means immediately before resetting the second integrating means each time, and addition means for adding values output from the first integrating means and the register at a predetermined ratio, wherein an energy amount supplied to the electro-mechanical energy conversion element is adjusted in accordance with an output from the addition means.

The above and other objects, features, and advantages of the present invention will be apparent from the following description in conjunction with the accompanying drawings.

DETAILED DESCRIPTION OF THE PREFERRED EMBODIMENTS

First Embodiment

Figure 2:
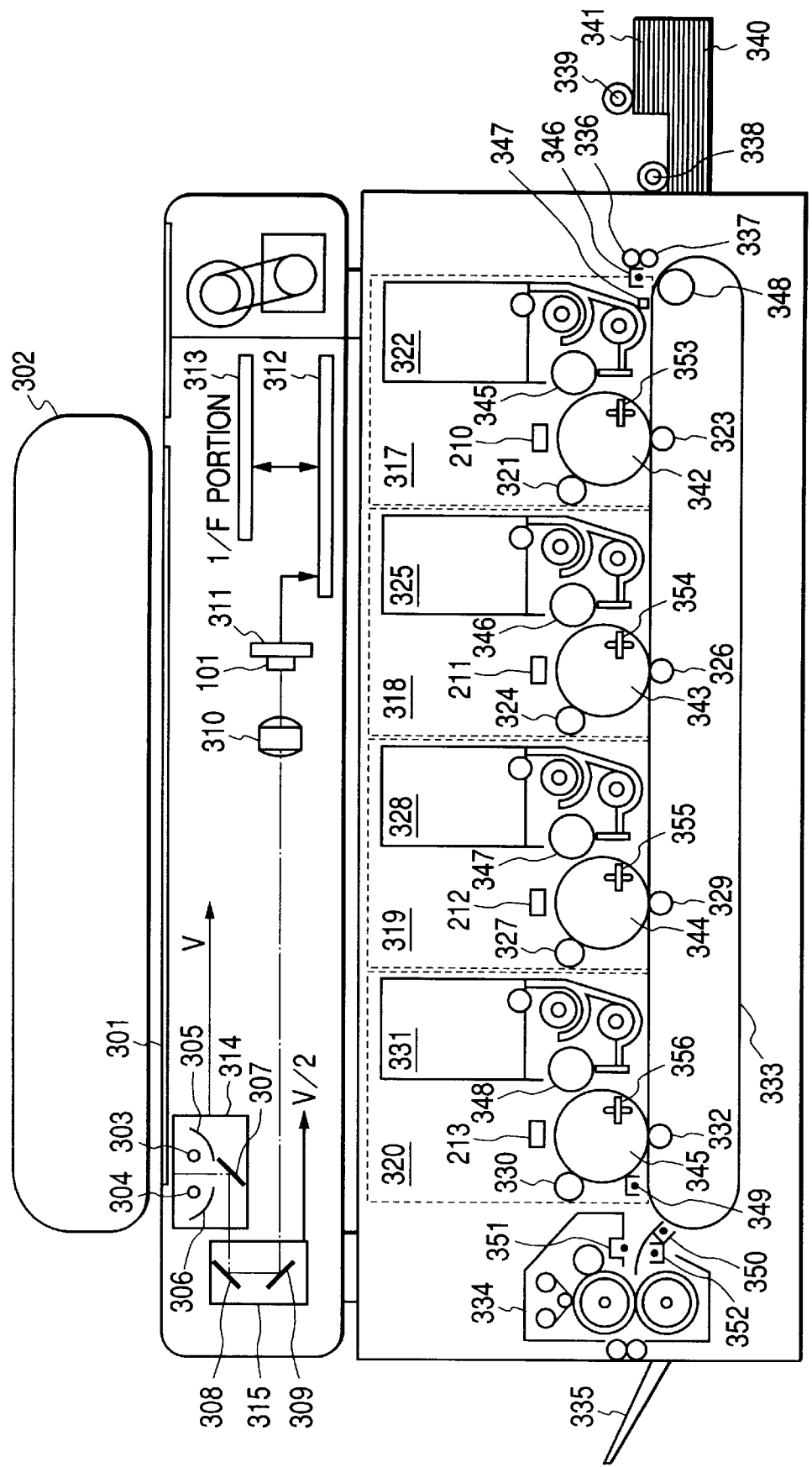
FIG. 2 is a schematic view showing an image forming apparatus used in the first embodiment of the present invention.

FIG. 2 is a schematic view showing the overall arrangement of a color image forming apparatus according to the first embodiment of the present invention. The color image forming apparatus will be described with reference to FIG. 2.

The arrangement of the reader section will be explained.

In FIG. 2, the reader section is constituted by a CCD 101, a substrate 311 on which the CCD 101 is mounted, a printer processor 312, a glass original table 301, an original feeder 302, light sources 303 and 304 for illuminating the original, reflectors 305 and 306 for condensing light from the light sources (303, 304) and sending the light toward the original, mirrors 307 to 309, a lens 310 for condensing the reflected or projected light from the original on the CCD 101, a carriage 314 for storing the light sources (303, 304), the reflectors (305, 306), and the mirror 307, a carriage 315 for storing the mirrors (308, 309), and an interface 313 with another component such as the IPU.

The entire surface of the original is scanned (subscanned) by mechanically moving the carriages 314 and 315 in a direction perpendicular to the electrical scanning (main scanning) direction of the CCD 101 at speeds V and V/2, respectively.

The original on the glass original table reflects light from the light sources (303, 304), and the reflected light is guided to the CCD 101 and converted into an electrical signal. The electrical signal (analog image signal) is input to the image processor 312 and converted into a digital signal. The converted digital signal is processed, transferred to the printer section, and used to form an image.

The arrangement of the printer section will be explained.

In FIG. 2, the printer section comprises an M (Magenta) image forming device 317, a C (Cyan) image forming device 318, a Y (Yellow) image forming device 319, and a K (blacK) image forming device 320. Since these devices have the same arrangement, only the M image forming device 317 will be explained, and a description of the remaining image forming devices will be omitted.

In the M image forming device 317, a latent image is formed on the surface of a photosensitive drum 342 serving as an image carrier by light from an LED array 210. A primary electro charging device 321 charges the surface of the photosensitive drum 342 to a predetermined potential to prepare for formation of the latent image. A developing device 322 develops the latent image on the photosensitive drum 342 to form a toner image. The developing device 322 includes a sleeve 345 for applying a developing bias and developing the image. A transfer electro charging device 323 discharges below of an endless transfer member convey belt 333 for conveying a transfer member, and transfers the toner image on the photosensitive drum 342 to a recording paper sheet or the like on the transfer member convey belt 333. In the first embodiment, a cleaner conventionally used is not arranged because of a high transfer efficiency, but it may be arranged.

The procedure of forming an image on, e.g., a recording paper sheet will be described. Recording paper sheets stacked in cassettes (340, 341) are picked up one by one by pickup rollers (339, 338) and supplied onto the transfer member convey belt 333 by paper feed rollers (336, 337). The fed recording paper sheet is charged by an attraction electro charging device 346. A transfer belt roller 348 drives the transfer belt 333, charges the recording paper sheet together with the attraction electro charging device 346, and attracts the recording paper sheet to the transfer member convey belt 333. A leading end sensor 347 detects the leading end of the recording paper sheet on the transfer member convey belt 333. The detection signal of the leading end sensor is transferred from the printer section to the color reader section, and used as a subscanning sync signal in transferring a video signal from the color reader section to the printer section.

The recording paper sheet is conveyed by the transfer member convey belt 333, and toner images are formed on the sheet surface in the order from M, C, Y, and K in the image forming devices 317 to 320. The recording paper sheet passing through the K image forming device 320 is charge-removed by an electro charge removing device 349 in order to facilitate separation from the transfer member convey belt 333, and then separated from the transfer member convey belt 333.

A separation electro charging device 350 prevents image disturbance by separation discharge in separating the recording paper sheet from the transfer member convey belt 333. The separated recording paper sheet is charged by pre-fixing electro charging devices (351, 352) in order to compensate for the toner adhesion strength and prevent image disturbance, and discharged to a discharge tray 335 after the toner image is thermally fixed by a fixing device 334.

A known vibration type motor is used as a driving motor for rotating the photosensitive drums (342–345) and the transfer member convey belt roller 348.

In the vibration type motor, an AC signal serving as an alternating signal is applied to a piezoelectric element as an electro-mechanical energy conversion element fixed to, e.g., an elastic member constituting a vibration member to generate circular or elliptical movement on the surface of the elastic member, and relatively moves a contact member in press contact with the elastic member, and the vibration member. In another type of vibration type motor using a stator as the vibration member and a rotor as the contact member, an output shaft arranged at the rotation center of the rotor is coupled to the rotor, and an output is extracted from this output shaft. The first embodiment employs this vibration type actuator having an output shaft.

Figure 3:
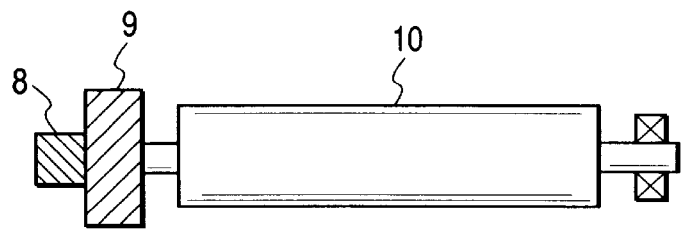
FIG. 3 is a schematic view showing the driving apparatus of a photosensitive drum in FIG. 2.

FIG. 3 is a schematic view showing the connection state between the photosensitive drum and the vibration type motor. In FIG. 3, a rotary encoder 8 outputs the rotational angle of the output shaft of a vibration type motor 9 as pulse information. A photosensitive drum 10 is connected to the output shaft of the vibration type motor 9.

Figure 1:
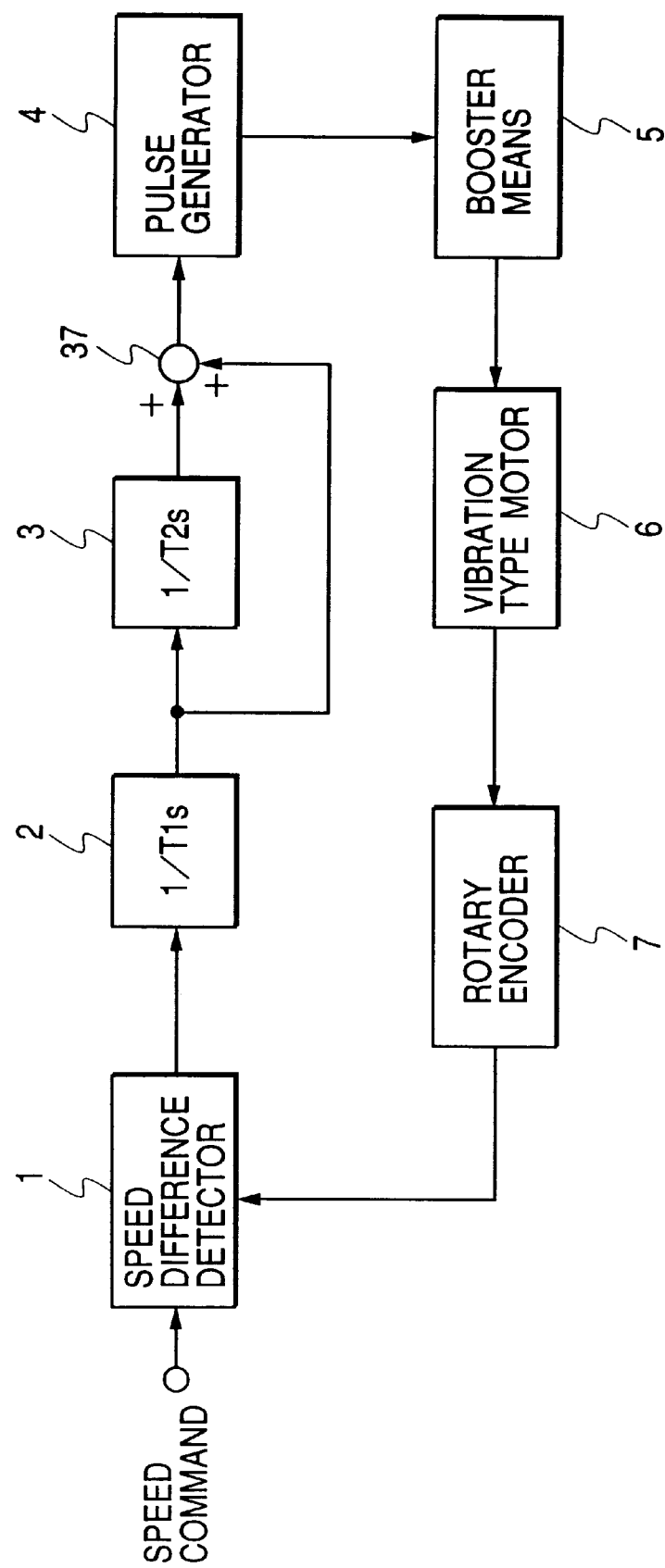
FIG. 1 is a block diagram showing control in the first embodiment of the present invention.
Figure 16:
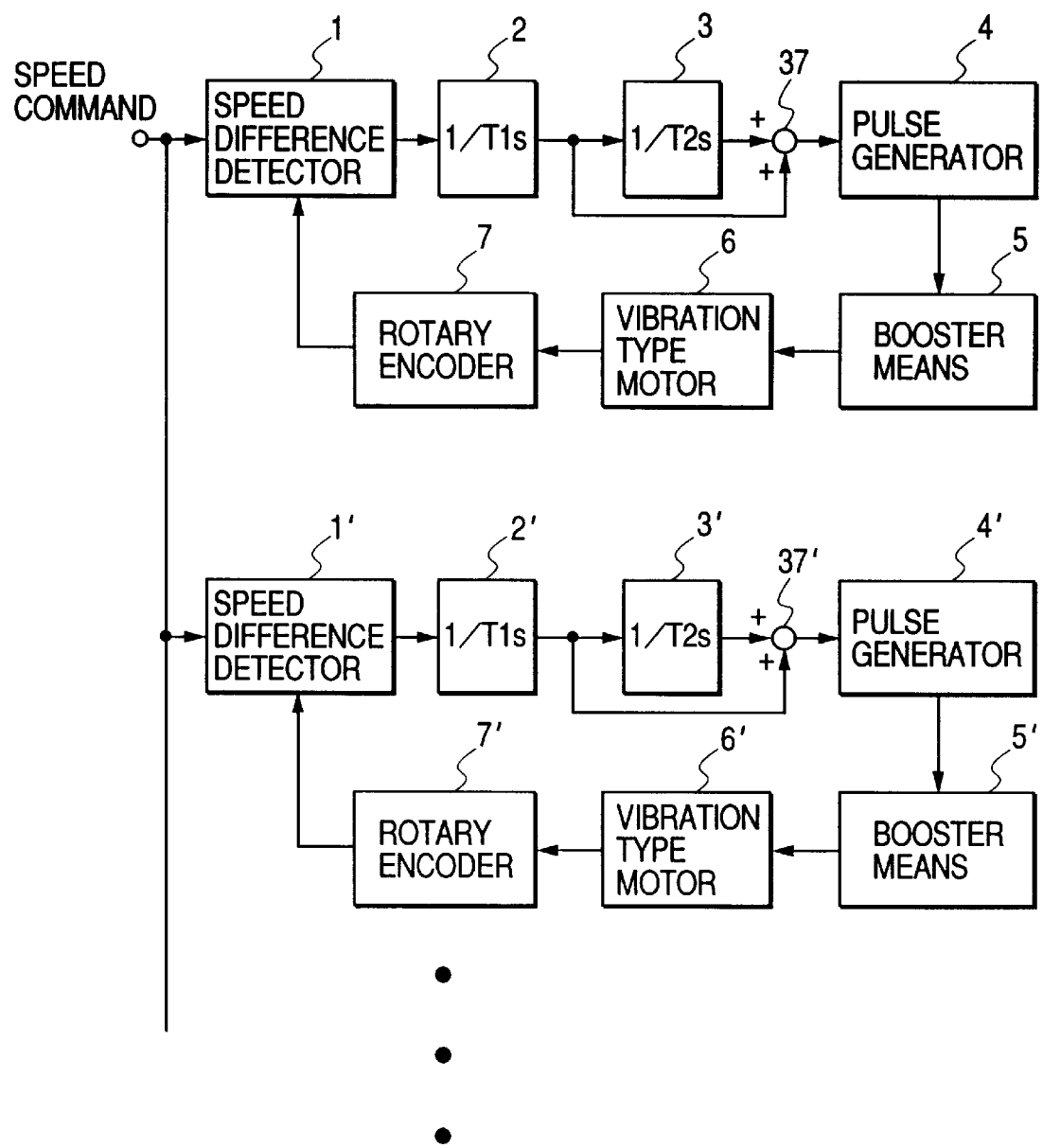
FIG. 16 is a block diagram showing the control apparatus in FIG. 1 applied to the image forming apparatus in FIG. 2.

FIG. 1 is a block diagram showing control of the vibration type motor according to the first embodiment of the present invention. FIG. 16 shows the arrangement in which a driving apparatus for one vibration type motor shown in FIG. 1 is used to drive a plurality of photosensitive drums and the transfer member convey belt in the image forming apparatus of FIG. 2. The blocks in FIG. 1 will be described below.

Figure 6:
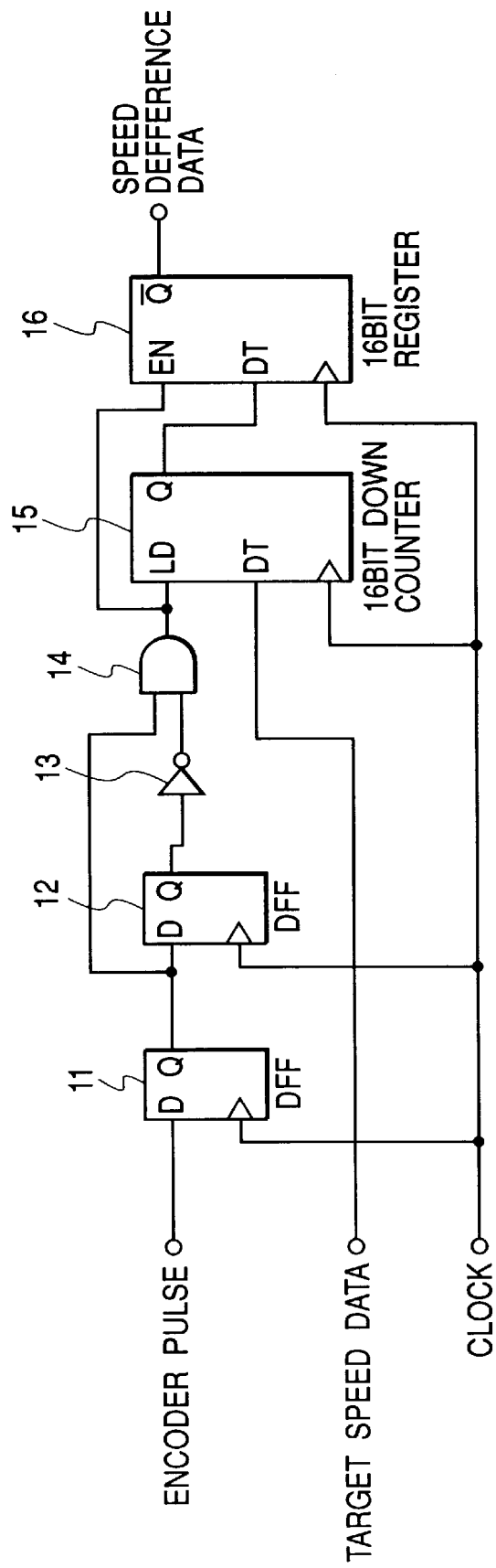
FIG. 6 is a circuit diagram showing a speed difference detector in FIG. 1.

In FIG. 1, a speed difference detector 1 detects and outputs the difference between a speed command value and a driving speed obtained based on pulse information from a rotary encoder 7 connected to the output shaft of a vibration type motor 6. FIG. 6 shows an example of the speed difference detector. The speed difference detector shown in FIG. 6 is formed by synchronous logic circuits including D flip-flops 11 and 12. When the input D of the D flip-flop 12 is at high level, and its output Q is at low level, an output from the D flip-flop 12 is detected as the leading edge of an input pulse from the encoder. At this time, an output from an AND gate 14 keeps high level during only one period pulse of a clock.

When an output from the AND gate 14 is at high level, i.e., upon completion of one clock pulse cycle from the leading edge of the encoder, target speed data is loaded to a 16 bit down counter 15. In the remaining time, the 16 bit down counter 15 counts down. The target speed data sets the count value when one period of a pulse from the encoder is counted by clocks during operation at a target speed. Target speed data v is given by $$v = fc/(N \times Ep) - 1$$

where fc is the clock frequency [Hz], N is the target rotational speed [1/s], and Ep is the number of output encoder pulses per rotation [P/R]. For example, when the target rotational speed is 1 [1/s], the clock frequency is 10 [MHz], and 2,000 pulses are output during one rotation of the motor, the target speed data is 4,999.

The value of the counter 15 is written in a 16 bit register 16 one clock cycle after detection of the edge of the encoder. The target speed is not loaded to the counter 15 yet when data is just written in the register 16, and the count value immediately before detection of the edge of the encoder is written.

Inverted data of the registered value is output from the output $\overline{Q}$ of the register 16. By this operation, the time between one leading edge and the next leading edge of the encoder is counted, and the register 16 outputs a value:

$$Te \times fc - v - 1$$

where v is the target speed data, Te is the period [sec] of a pulse output from the encoder, and fc is the clock frequency [Hz].

Figure 7:
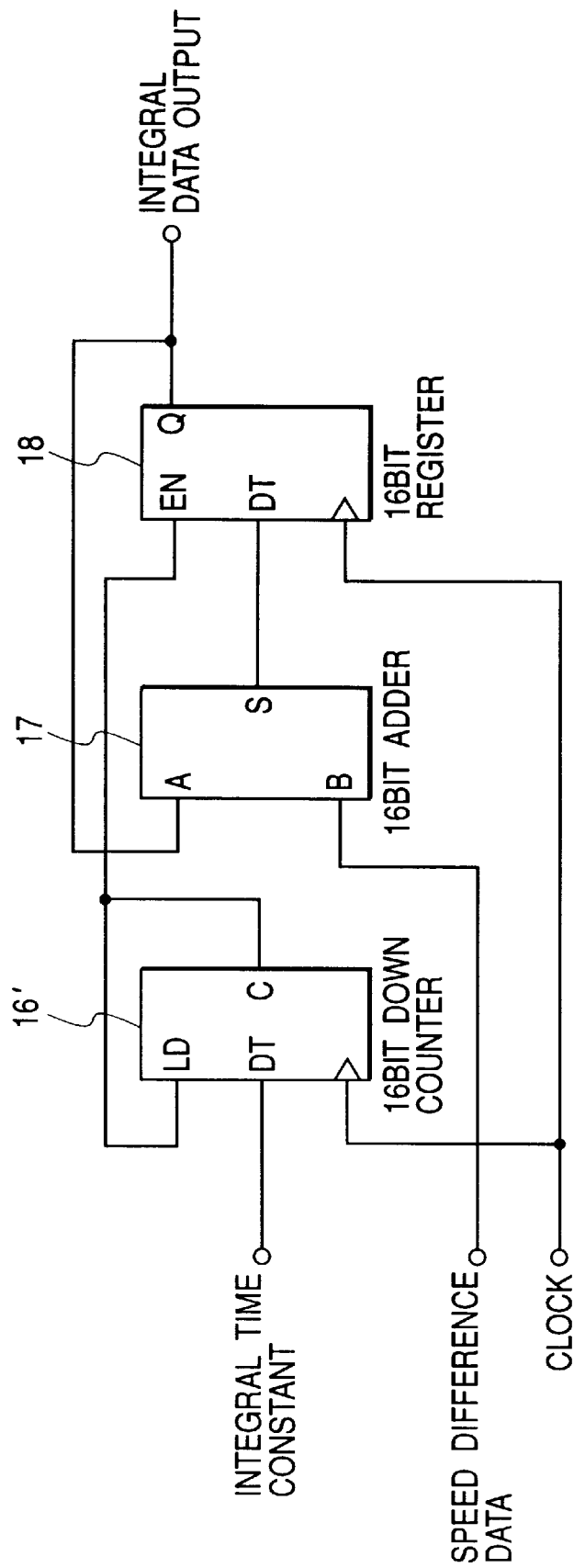
FIG. 7 is a circuit diagram showing an integrator in FIG. 1.

Referring back to FIG. 1, the speed difference data detected in this manner is input to a first integrator 2. FIG. 7 is a circuit diagram showing the internal arrangement of the first integrator 2. In the control circuit of the first embodiment, the integral time constants of the integrator 2 and an integrator 3 are used as adjustable control parameters.

In FIG. 7, the carry output C of a 8 bit down counter 16' changes to high level when the value of down counter becomes 0. Then, integral time constant data is loaded and down count is performed. By this operation, the down counter 16' constitutes a ring counter using integral time constant data as a period.

The carry output C of the down counter 16' outputs a signal which keeps high level during only one clock cycle once in one period of the ring counter.

A 16 bit adder 17 adds data of a 16 bit input A and input B, and outputs the sum data from an output S. The output data is input to a 16 bit register 18.

In the register 18, data is loaded at the timing of an integral time constant output from the down counter. As a result, integral data corresponding to the integral time constant is output from the output Q of the register 18.

Note that the first embodiment also requires a circuit for initializing integral data in the integrator before driving the vibration type motor, and an arrangement for setting upper and lower limits for an integral result to prevent integral data from overflowing, though a description thereof is omitted for the sake of descriptive convenience.

Referring back to FIG. 1, the second integrator 3 has the same internal arrangement as that of the first integrator 2. The second integrator 3 integrates data integrated by the first integrator 2 with an integral time constant set separately from the first integrator 2.

An adder 37 is a 16 bit adder identical to the adder 17 shown in FIG. 7. The adder 37 adds data obtained by integrating speed difference data by the first integrator 2 and data obtained by integrating the data from the first integrator 2 by the second integrator 3. Data output from the adder 37 is used as a manipulated variable.

The first embodiment uses the frequency of an AC voltage applied to the vibration type motor as a manipulated variable for controlling the speed of the vibration type motor.

Figure 11:
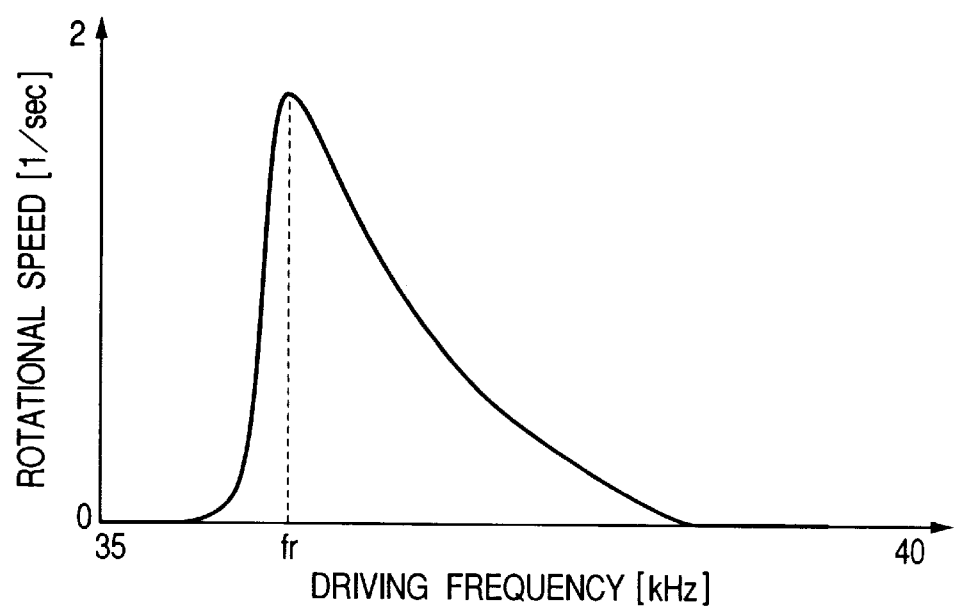
FIG. 11 is a graph showing the relationship between the frequency and the speed of the vibration type motor.

FIG. 11 shows the rotational speed of the vibration type motor vs. the frequency of an AC voltage applied to the vibration type motor. As shown in FIG. 11, the rotational speed exhibits a peak at a resonance frequency fr of the vibration type motor. Since the characteristic is varied smoothly at frequencies higher than the resonance frequency fr and is relatively easily controlled, the rotational speed is normally controlled in the range of frequencies higher than the resonance frequency fr.

Figure 8:
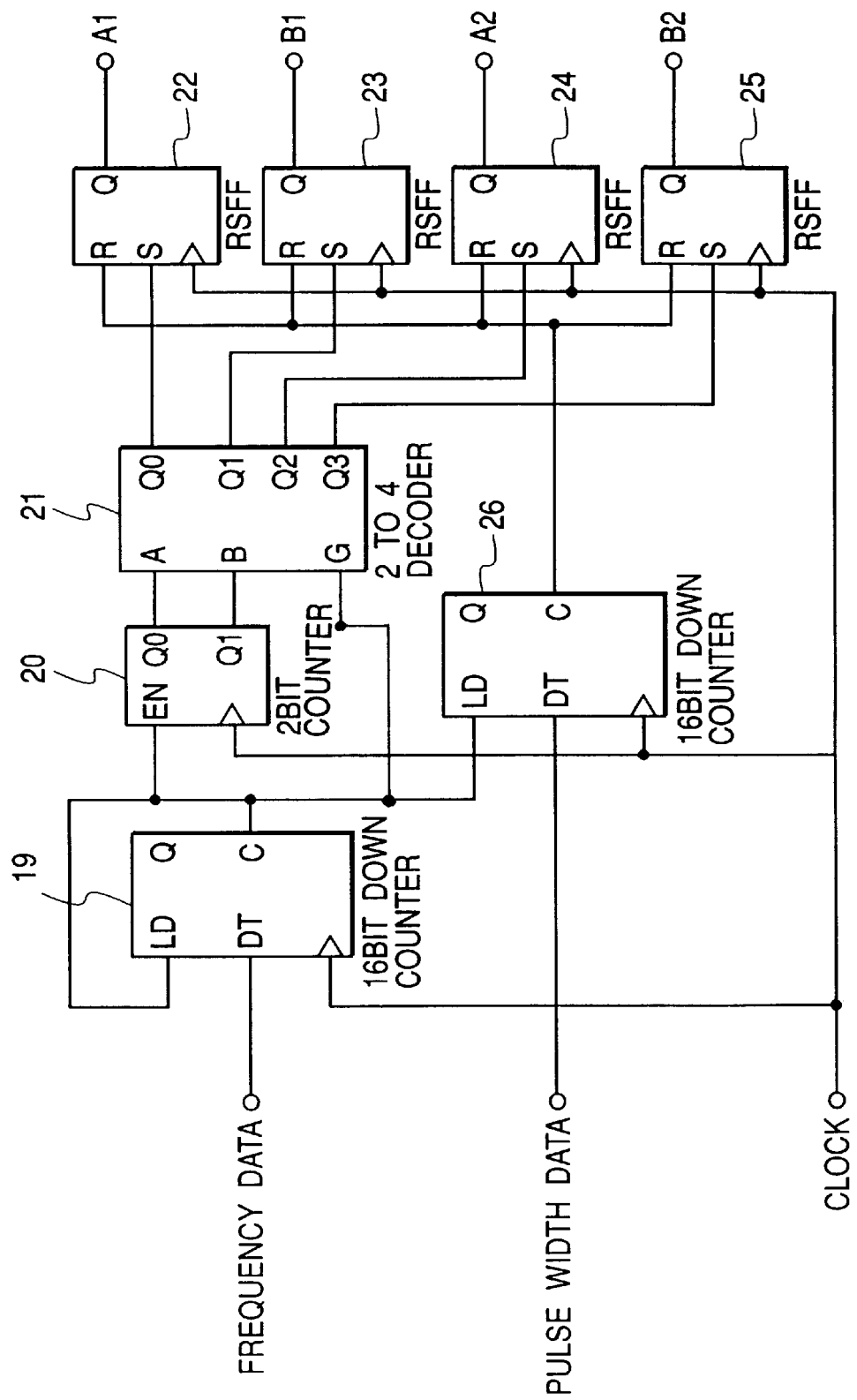
FIG. 8 is a circuit diagram showing a pulse generator in FIG. 1.

Referring back to FIG. 1, a pulse generator 4 outputs four phase pulse signals each having a frequency output from the adder 37 and a predetermined pulse width. FIG. 8 is a circuit diagram showing the internal arrangement of the pulse generator 4.

In FIG. 8, a 16 bit down counter 19 outputs a high-level signal from the output C when a count value is 0. When the high-level signal is output from the output C, the load input LD of the down counter 19 changes to high level to load frequency data to the counter. After that, the down counter 19 performs a down count operation.

With this arrangement, a signal which keeps high level during only one clock cycle with respect to frequency data as one period is output from the carry output C of the down counter 19.

Note that frequency data in the first embodiment is actually a value corresponding to the period of the driving frequency. Since one period of a driving alternating wave for the vibration type motor corresponds to four periods of the down counter 19, the frequency data is set to a value corresponding to ¼ of the period of the driving frequency of the vibration type motor. The carry output C of the down counter 19 is input as an enable signal EN to a 2 bit counter 20.

The counter 20 counts up every time that the carry signal of the counter 19 is output. The count value repeats four states 0 to 3. The outputs Q0 and Q1 of the counter are input to a 2 to 4 decoder 21.

When input G is at low-level, all the outputs Q0 to Q3 of the decoder 21 change to low level. When input G is at high-level, any of the outputs Q0 to Q3 changes to high level in accordance with a combination of inputs A and B.

If both the inputs A and B are at low level, the output Q0 changes high level; if the input A is at high level, and the input B is at low level, the output Q1 changes to high level; if the input A is at low level, and the input B is at high level, the output Q2 changes to high level; and if both the inputs A and B are at high level, the output Q3 changes to high level.

With this arrangement, the decoder 21 outputs Q0 to Q3 such that they sequentially change to high level during only one period of the clock cycle when the carry output C using frequency data output from the down counter 19 as one period changes to high level.

The outputs Q0 to Q3 of the decoder 21 are input to the set inputs S of RS flip-flops 22 to 25.

The outputs Q of the RS flip-flops 22 to 25 changes to high level when each set input S is at high-level, and keep high level until the reset inputs R change to high level. The reset inputs R of the RS flip-flops 22 to 25 receive the carry output C of a 16 bit down counter 26.

The down counter 26 is used for determining the pulse width. When the outputs Q of the RS flip-flops 22 to 25 change to high level, i.e., the carry output C of the down counter 19 changes to high level, the load input LD of the down counter 26 receives a high-level signal.

After the load input LD of the down counter 26 receives the high-level signal, external pulse width data is loaded to the down counter 26. This pulse width data is a fixed value or a predetermined value given by a controller (not shown).

The pulse width data must be smaller than the above-mentioned frequency data. With this arrangement, the down counter 26 changes to high level upon the lapse of a time corresponding to the pulse width data after the output Q of any of the RS flip-flops changes to high level.

Figure 9:
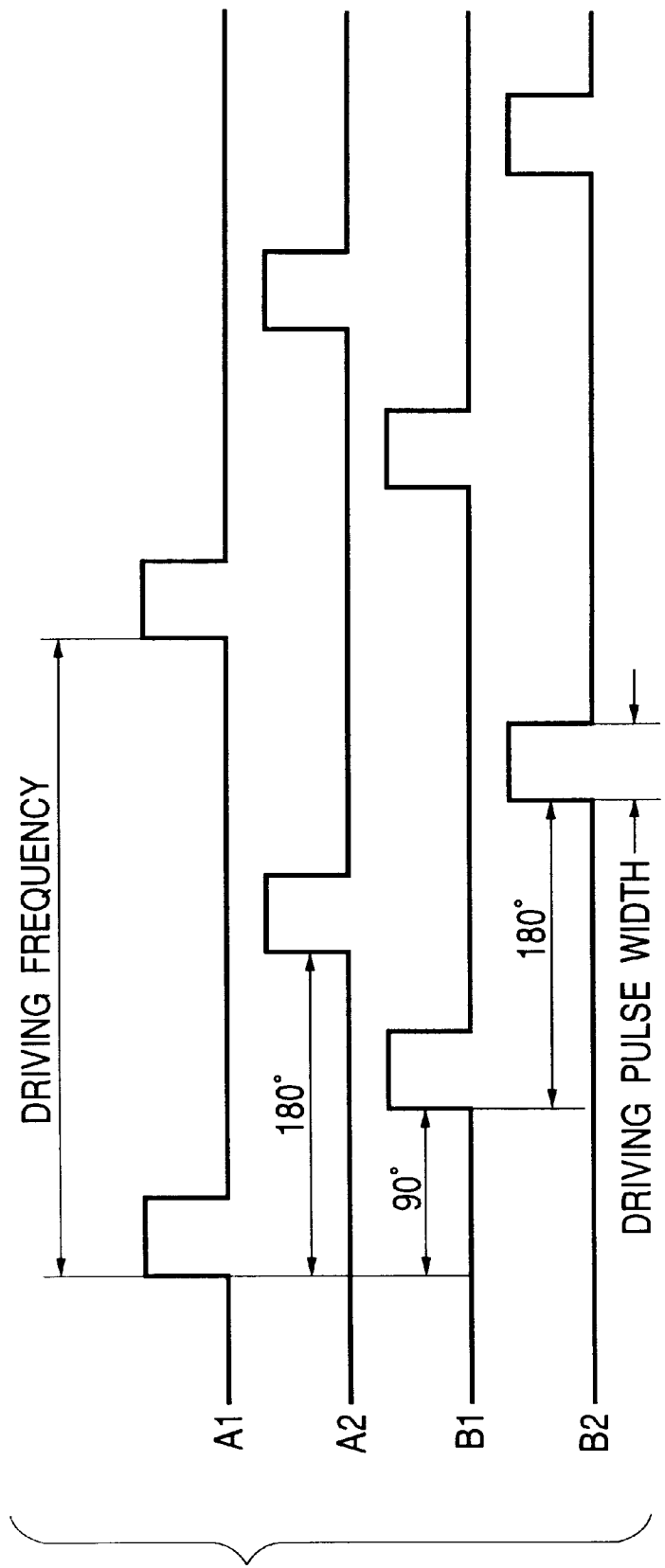
FIG. 9 is a timing chart showing a pulse output from the pulse generator in FIG. 8.

By the above operation, outputs A1, A2, B1, and B2 from the pulse generator are output as pulses each having a period four times the period of the frequency data and a pulse width corresponding to the pulse width data. FIG. 9 is a timing chart showing the outputs A1, A2, B1, and B2. As shown in FIG. 9, the pulses A1 and A2 and the pulses B1 and B2 have a phase difference of 180°, respectively. The pulse widths of the pulses A1 and B1 and those of the pulses A2 and B2 have a phase difference of 90°, respectively. The four phase pulses output from the pulse generator are input to a booster means 5 in FIG. 1.

Figure 10:
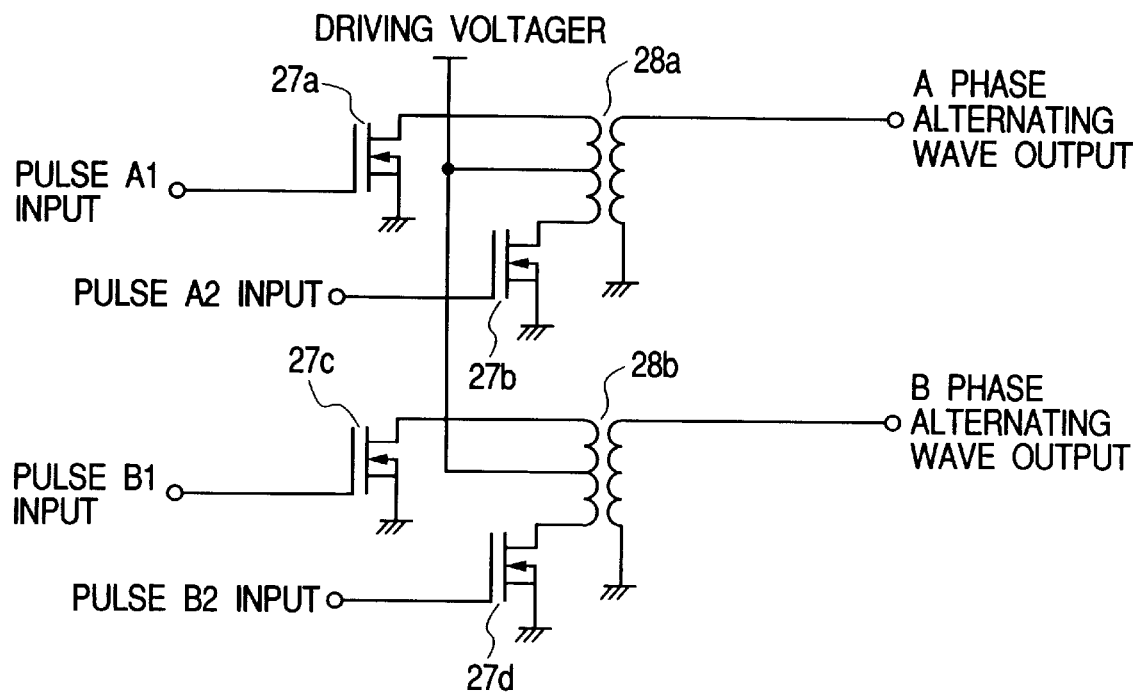
FIG. 10 is a circuit diagram showing a booster means in FIG. 1.

FIG. 10 is a circuit diagram showing the internal arrangement of the booster means. The booster means 5 generates two phase alternating waves for driving the vibration type motor on the basis of pulse signals from the pulse generator 4. The two phase alternating waves are signals having the same frequency, a voltage amplitude of about 300 Vp-p, and a time phase difference of 90°.

In FIG. 10, the booster means 5 comprises FETs 27a, 27b, 27c, and 27d. The FETs 27a and 27b are for generating an A phase driving signal, whereas the FETs 27c and 27d are for generating a B phase driving signal.

The booster means 5 further comprises transformers 28a and 28b with center taps. In FIG. 10, the primary center tap electrode of the transformer 28a is connected to a power supply voltage. The power supply voltage is a DC voltage generated by, e.g., a switching regulator in the device.

The image forming apparatus of the first embodiment adopts a power supply voltage of 24 V. The remaining two primary electrodes are respectively connected to the drains of the FETs 27a and 27b. The FET 27a is driven by the pulse signal A1 output from the pulse generator, and the FET 27b is driven by the pulse signal A2. As a result, a current alternately flows from the center tap to the remaining two terminals on the primary side of the transformer 28a.

An AC signal corresponding to the boosting ratio of the transformer 28a is generated on the secondary side of the transformer 28a, and serves as an A phase alternating wave output. Similarly, a B phase alternating wave output is generated. By using four phase pulse signals like the ones shown in FIG. 9 as gate signals to the FETs 27a to 27d, a time phase difference of 90° is given to the A and B phase alternating wave outputs in FIG. 10. The phase alternating signals generated in the above arrangement are input to the vibration type motor 6 in FIG. 1.

The vibration type motor 6 is driven by the above-described principle. As shown in FIG. 3, the rotary encoder 8 is connected to one output shaft of the vibration type motor 9. A pulse signal corresponding to the rotational speed output from the encoder 8 is input to the speed difference detector 1 in FIG. 1.

The above arrangement forms such a feedback loop as to make the rotational speed of the vibration type motor constant.

Figure 4A:
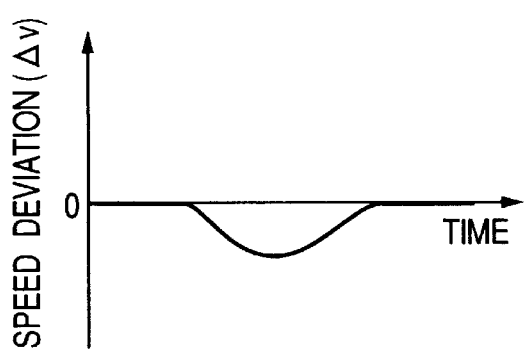
FIGS. 4A, 4B, 4C and 4D are graphs for explaining the speed deviation and position deviation.
Figure 4B:
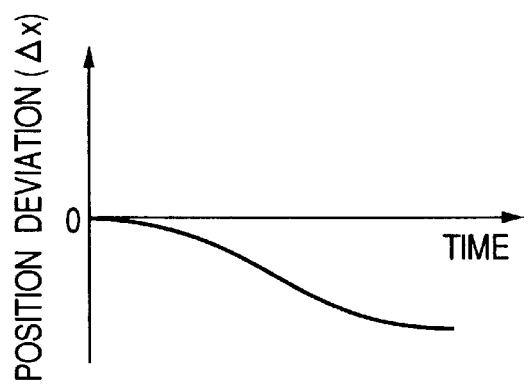
Figure 4C:
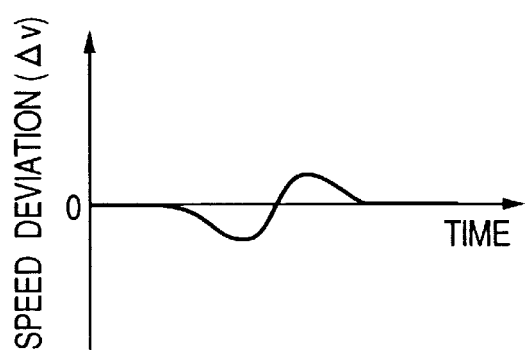
Figure 4D:
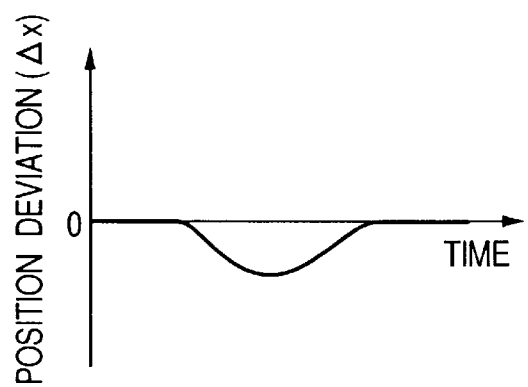

In the first embodiment, the two, first and second integrators 2 and 3 are used. The integral value of the first integrator 2 is directly input to the adder 37 to eliminate the steady-state deviation from a target speed, as shown in FIG. 4C. A double integral value obtained by integrating the integral value of the first integrator 2 by the second integrator is input to the adder 37 to eliminate the steady-state error of the position from a target value, as shown in FIG. 4D.

When photosensitive drums for respective colors and the transfer member convey belt in the color copying machine shown in FIG. 2 are driven by the vibration type motor, for example, when the leading end of the transfer member enters the nip of each photosensitive drum at the transfer position, a load is applied to the photosensitive drum and decrease the speed. As a result, the transfer position of a toner image on the transfer member may be shifted. In this case, a decrease in speed is detected by the speed difference detector 1 and integrated by the first integrator 2. The integral value itself allows it to use the detected speed as a speed command value, but cannot compensate a delay by the decrease in speed. However, the integral value of the first integrator 2 is further integrated by the second integrator 3, and the obtained double integral value can compensate for the delay.

More specifically, a signal output from the adder 37 to the pulse generator 4 rotates the vibration type motor 6 to a target rotational angle within a predetermined time so as to eliminate position deviation, while adjusting the speed to a target speed to eliminate speed deviation.

This can eliminate not only speed deviations of all the photosensitive drums but also the steady-state errors of the moving distances of the photosensitive drums from target values upon forming images on the photosensitive drums.

When a control system using two integrators is constituted as an electromagnetic motor speed control system, the phase delay of the closed loop transfer characteristic increases to make the system unstable.

The vibration type motor, however, is free from this problem because it has a higher response speed than that of the electromagnetic motor. In other words, a vibration type motor not using a heavy rotor has a smaller inertial force than that of an electromagnetic motor using a heavy coil as a rotor. In addition, since the coil of the electromagnetic motor is an inductance element, the magnetic field generation timing is delayed. To the contrary, since the vibration type motor is driven by vibrations generated by applying a voltage to a piezoelectric element, it exhibits a high response speed.

Second Embodiment

Figure 12:
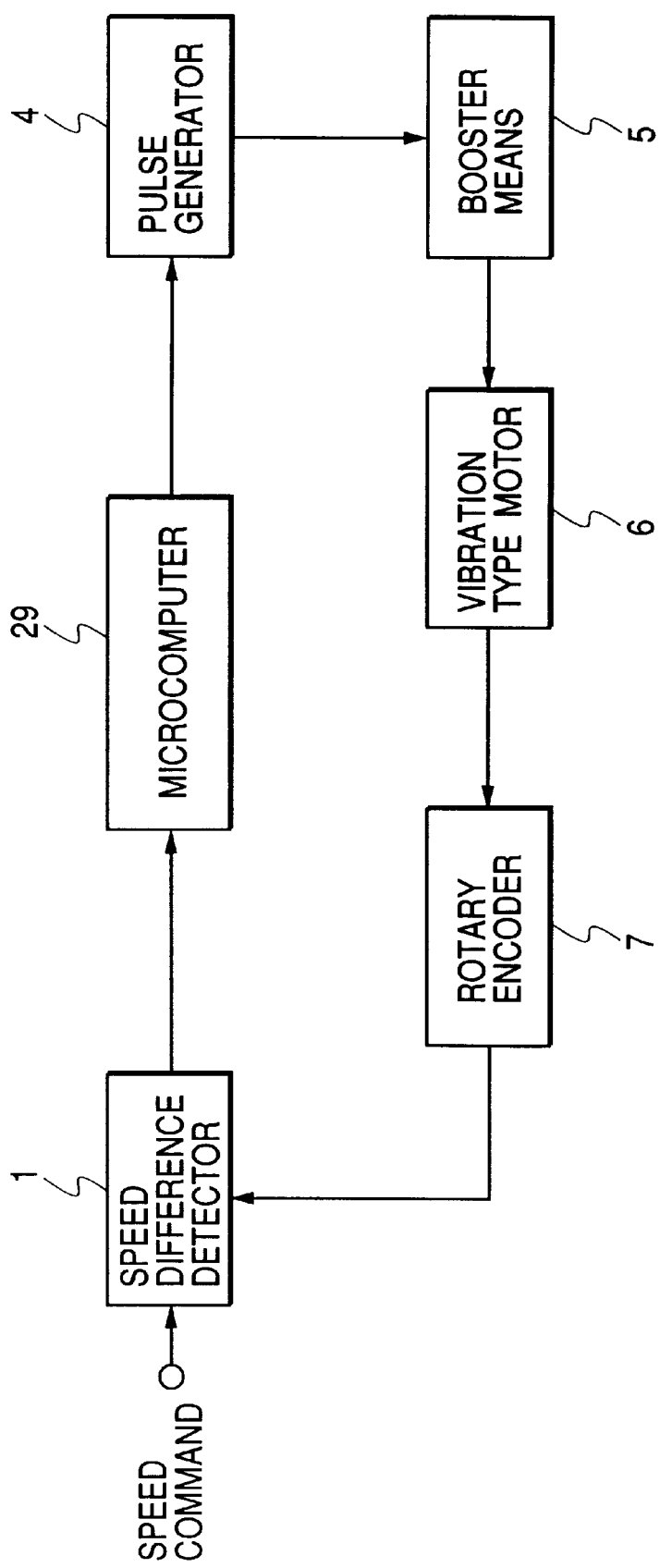
FIG. 12 is a block diagram showing a control apparatus according to the second to fourth embodiments of the present invention.

FIG. 12 is a block diagram showing the second embodiment of the present invention.

In the first embodiment, the calculation section of the control system is constituted by a digital circuit. In the second embodiment, as shown in FIG. 12, the control system is realized by a microcomputer.

Figure 13:
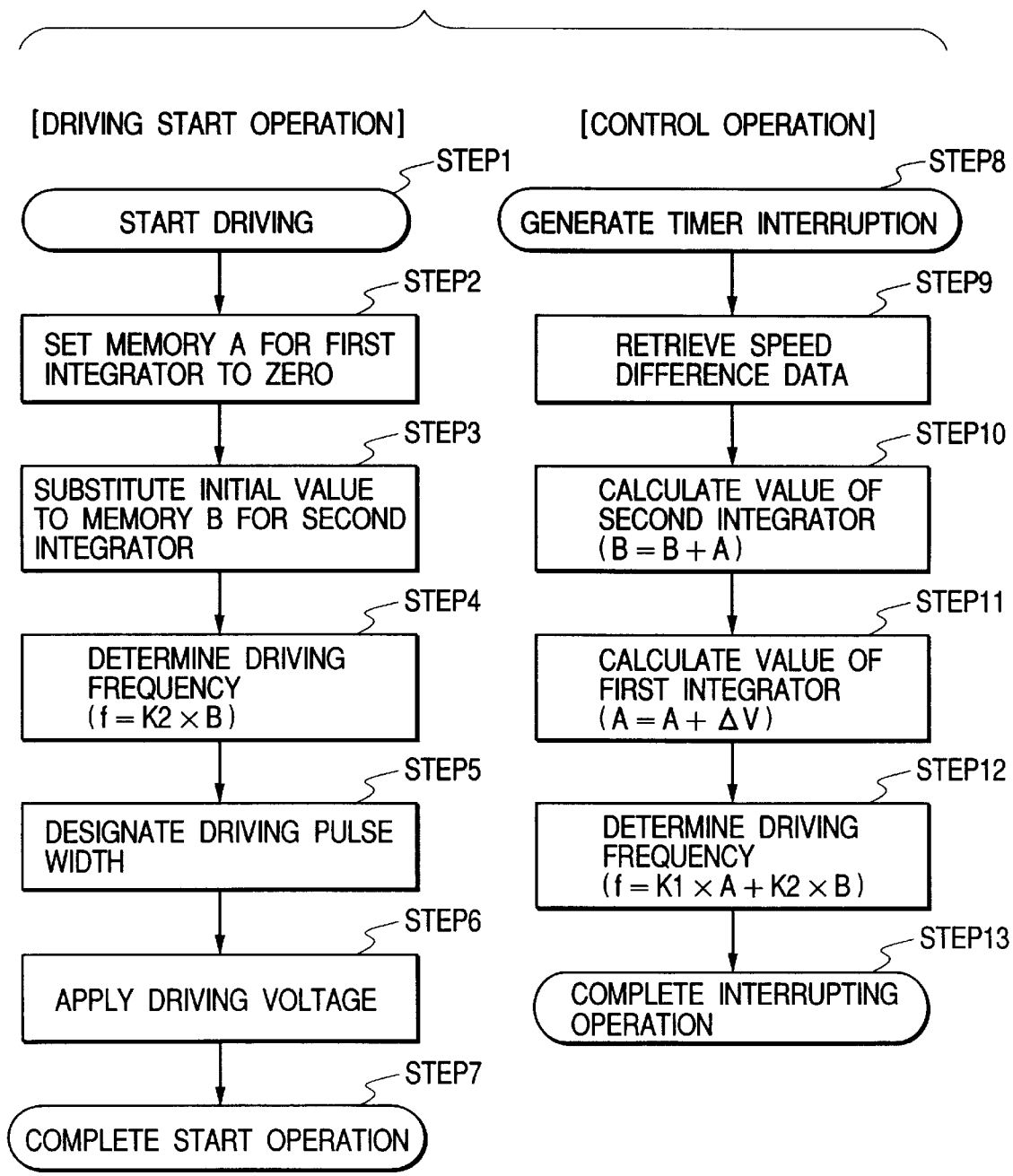
FIG. 13 is a flow chart showing operation of a microcomputer in the second embodiment of the present invention.

In the second embodiment, first integral operation is performed using memory A inside the microcomputer, and second integral operation is performed using memory B. FIG. 13 is a flow chart showing internal operation of a microcomputer 29. Operation of the microcomputer will be described with reference to FIG. 13.

The microcomputer performs two operations, i.e., operation at the start of the vibration type motor and speed control operation after starting. The driving start operation will be first explained.

In STEP 1, driving starts upon reception of an external vibration type motor driving command.

In STEP 2, the value of memory A inside the microcomputer that is used as a memory means for first integral operation is set to zero.

In STEP 3, an initial value is substituted to the value of memory B inside the microcomputer that is used as a memory means for second integral operation.

In STEP 4, a value prepared by multiplying the value set in memory B initialized in STEP 3 by a gain K2 for the second integral means is determined as a frequency command. This frequency is called an initial frequency serving as the frequency of an AC voltage applied to the vibration type motor at the start. The initial frequency is around the vibration mode in which the vibration type motor is driven, and is set higher than the resonance frequency fr in the vibration mode. The determined frequency command is output to a pulse generator 4 in FIG. 12.

In STEP 5, the driving pulse width is designated. The driving pulse width is the width of a pulse input to the gate terminal of each of FETs 27a to 27d shown in FIG. 10, and is set to such a value as not to damage the FETs and transformers. The set pulse value is kept unchanged until the vibration type motor stops. The determined pulse width is output to the pulse generator 4 in FIG. 12.

In STEP 6, a driving voltage is applied to the vibration type motor. In the previous steps, no pulses are output from a gate circuit (not shown) to the gate terminals of the FETs 27a to 27d. In STEP 6, pulses are first output to the gate terminals. The operation in STEP 6 may be performed by applying the power supply voltage to the primary sides of transformers 28a and 28b.

After the above steps, the driving start operation is complete in STEP 7.

The control operation will be described. The vibration type motor is controlled by changing, using a timer interruption, the frequency applied to the vibration type motor every predetermined time. In STEP 8, a timer interruption is generated.

In STEP 9, speed difference data ($\Delta V$) is retrieved from a speed difference detector 1 in FIG. 12.

In STEP 10, A+B is calculated and substituted to memory B for second integral operation in order to integrate the value of memory A in which the result of first integral operation is stored.

In STEP 11, A+$\Delta V$ is calculated and substituted to memory A in order to perform first integral operation. Calculation for memory B is performed in STEP 10 before calculation for memory A in STEP 11 because second integral operation is performed using the result of first integral operation determined by a previous timer interruption.

In STEP 12, memories A and B in which the results of integral operation are stored are used to determine the driving frequency by $$f = K1 \times A + K2 \times B$$

where f is the determined driving frequency data, K1 is the control gain for the result of the first integral operation, and K2 is the control gain for the result of the second integral operation. After the driving frequency is determined, the determined value is output to the pulse generator 4 in FIG. 12.

Upon the above operation, the interrupting operation is complete in STEP 13, and the flow waits for generation of a next timer interruption. If the next timer interruption is generated, the flow returns to STEP 8 to control the vibration type motor again. This operation is executed until the motor stops.

With this arrangement, the vibration type motor can be controlled similarly to the first embodiment of the present invention, and the same effects as those in the first embodiment can be obtained.

Third Embodiment

Figure 14:
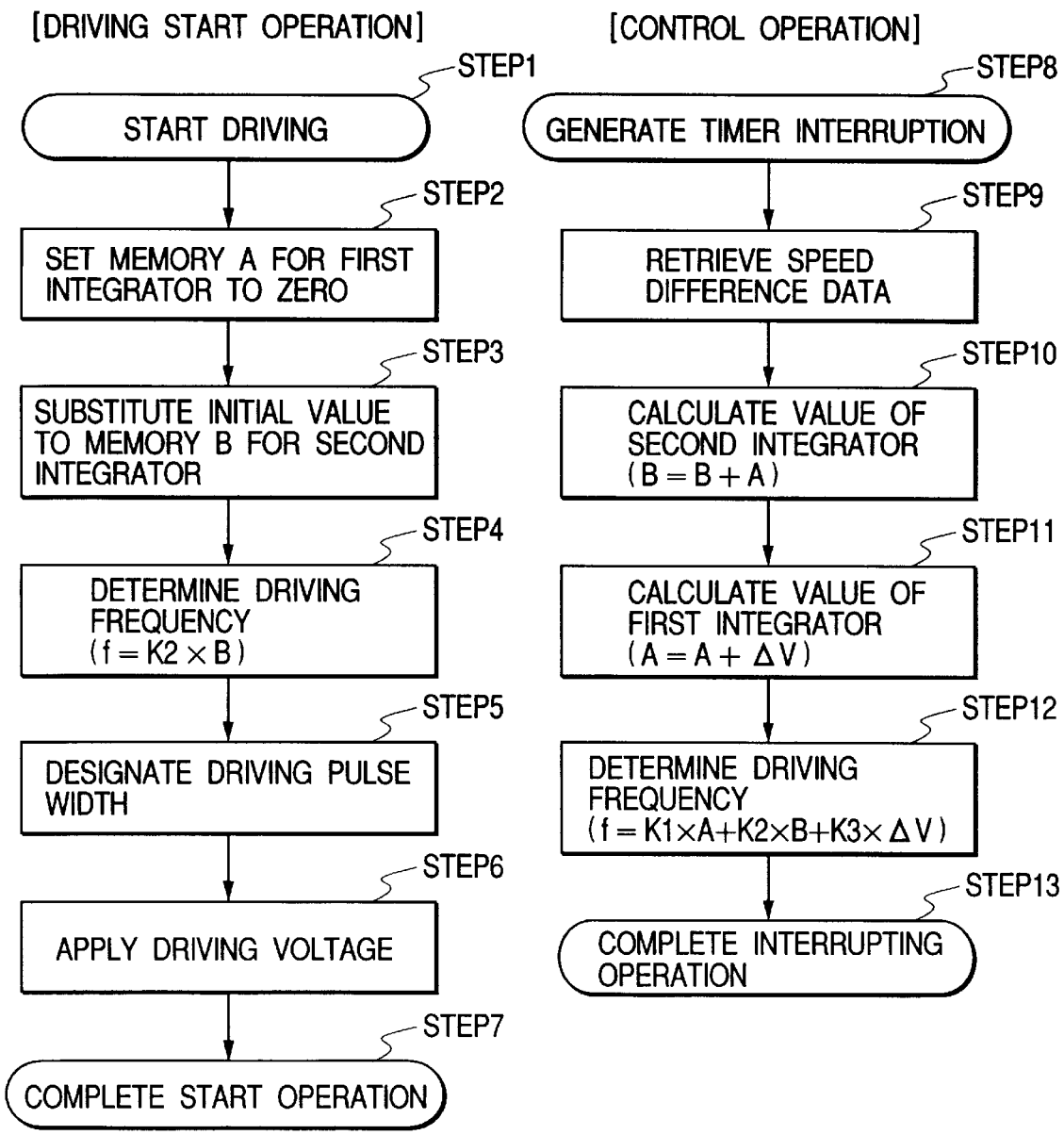
FIG. 14 is a flow chart showing operation of the microcomputer in the third embodiment of the present invention.

FIG. 14 is a flow chart showing the third embodiment of the present invention. The third embodiment is the same as the second embodiment of the present invention except for the flow chart. The flow chart in the third embodiment is different from that in the second embodiment only by determination of the driving frequency in STEP 12, and thus only STEP 12 will be explained.

In STEP 12, the driving frequency is determined by $$f = K1 \times A + K2 \times B + K3 \times \Delta V$$

The term $K3 \times \Delta V$ not present in the second embodiment; is added as a proportional element in order to improve the response characteristics obtained in the second embodiment, where K3 is the proportional gain.

Since the vibration type motor is controlled with this arrangement, the same effects as those in the first and second embodiments can be obtained, and in addition the response characteristics can be improved.

Fourth Embodiment

Figure 15:
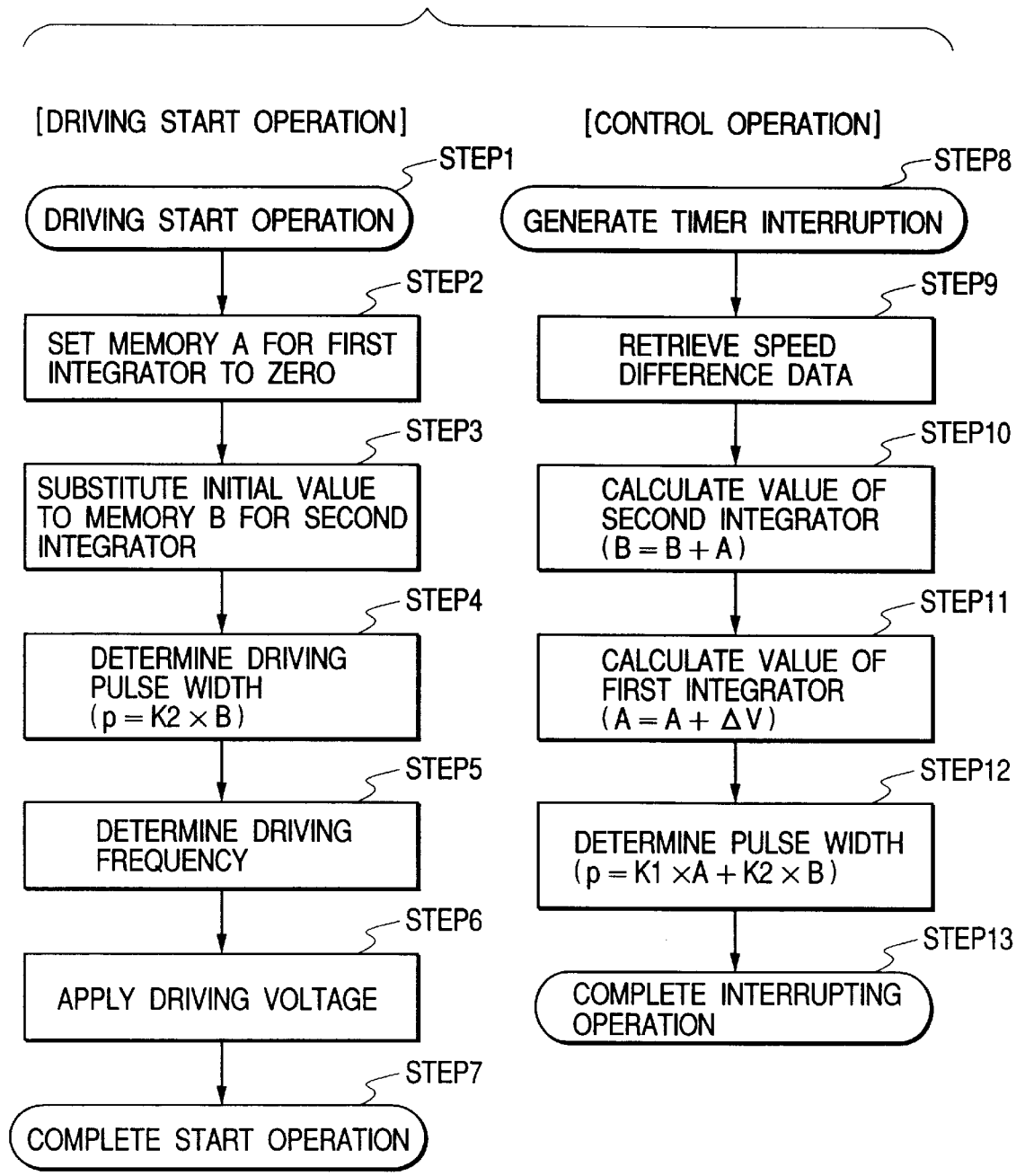
FIG. 15 is a flow chart showing operation of the microcomputer in the fourth embodiment of the present invention.

FIG. 15 is a flow chart showing the fourth embodiment of the present invention. The control block is performed by the same arrangement as that in FIG. 12, like the second and third embodiments.

In the first to third embodiments, the speed of the vibration type motor is controlled by controlling the frequency of the vibration type motor. In the fourth embodiment, the speed is controlled by controlling pulse width data input to the pulse generator. Operation of the fourth embodiment will be described with reference to FIG. 15.

The microcomputer performs two operations, i.e., operation at the start of the vibration type motor and speed control operation after starting. The driving start operation will be first explained.

In STEP 1, driving starts upon reception of an external vibration type motor driving command.

In STEP 2, the value of memory A inside the microcomputer that is used as a memory means for first integral operation is set to zero.

In STEP 3, an initial value is substituted to the value of memory B inside the microcomputer that is used as a memory means for second integral operation.

In STEP 4, a value prepared by multiplying the value set in memory B initialized in STEP 3 by a gain K2 for the second integral means is determined as a pulse width command. This pulse width serves as the pulse width of an AC voltage applied to the vibration type motor at the start. The determined pulse width command is output to a pulse generator 4 in FIG. 12.

In STEP 5, the driving frequency is designated. The driving frequency is selected to satisfactorily drive the vibration type motor at a target speed. The frequency capable of satisfactorily driving the vibration type motor means one capable of rotating the vibration type motor at a higher speed than a target speed for a large pulse width and rotating it at the target speed by increasing/decreasing the pulse width. The determined frequency is output to the pulse generator 4 in FIG. 12.

In STEP 6, a voltage is applied to the vibration type motor. In the previous steps, no pulses are output from a gate circuit (not shown) to the gate terminals of the FETs. In STEP 6, pulses are first output to the gate terminals. The operation in STEP 6 may be performed by applying, the power supply voltage to the primary sides of the transformers.

After the above steps, the driving start operation is complete in STEP 7.

The control operation will be described. The vibration type motor is controlled by changing, using a timer interruption, the pulse width applied to the vibration type motor every predetermined time. In STEP 8, a timer interruption is generated.

In STEP 9, speed difference data ($\Delta V$) is retrieved from a speed difference detector 1 in FIG. 12.

In STEP 10, A+B is calculated and substituted to memory B for second integral opration in order to integrate the value of memory A in which the result of first integral operation is stored.

In STEP 11, A+$\Delta V$ is calculated and substituted to memory A in order to perform first integral operation. Calculation for memory B is performed in STEP 10 before calculation for memory A in STEP 11 because second integral operation is performed using the result of first integral operation determined by a previous timer interruption.

In STEP 12, memories A and B in which the results of integral operation are stored are used to determine the pulse width by $$p = K1 \times A + K2 \times B$$

where p is the determined pulse width data, K1 is the control gain for the result of the first integral operation, and K2 is the control gain for the result of the second integral operation. After the driving pulse width is determined, the determined value is output to the pulse generator 4 in FIG. 12.

Upon the above operation, the interrupting operation is complete in STEP 13, and the flow waits for generation of a next timer interruption. If the next timer interruption is generated, the flow returns to STEP 8 to control the vibration type motor again. This operation is executed until the motor stops.

With this arrangement, the vibration type motor can be controlled similarly to the first and second embodiments described above. When the vibration type motor is controlled by operating the pulse width, as in the fourth embodiment, a proportional term may be considered as in the third embodiment.

Although not described, the speed of the vibration type motor can also be controlled by controlling the phase difference between two-phase AC voltages applied thereto, instead of controlling the frequency or pulse width as described in the above embodiments.

In these embodiments, the driving circuit is controlled using a logic circuit or microprocessor. However, a means for realizing the present invention is not limited to this, and the present invention can employ all means capable of determining the manipulated variable using a value prepared by integrating the deviation with an integrator and a value prepared by integrating the integral result.

As a detection means for detecting the driving state of the vibration type actuator, the speed is detected. Alternatively, the acceleration, position, or vibration state of the vibration type actuator may be detected, and the difference between the detected value and a reference value may be obtained and integrated by the first integral means.

Fifth Embodiment

Figure 17:
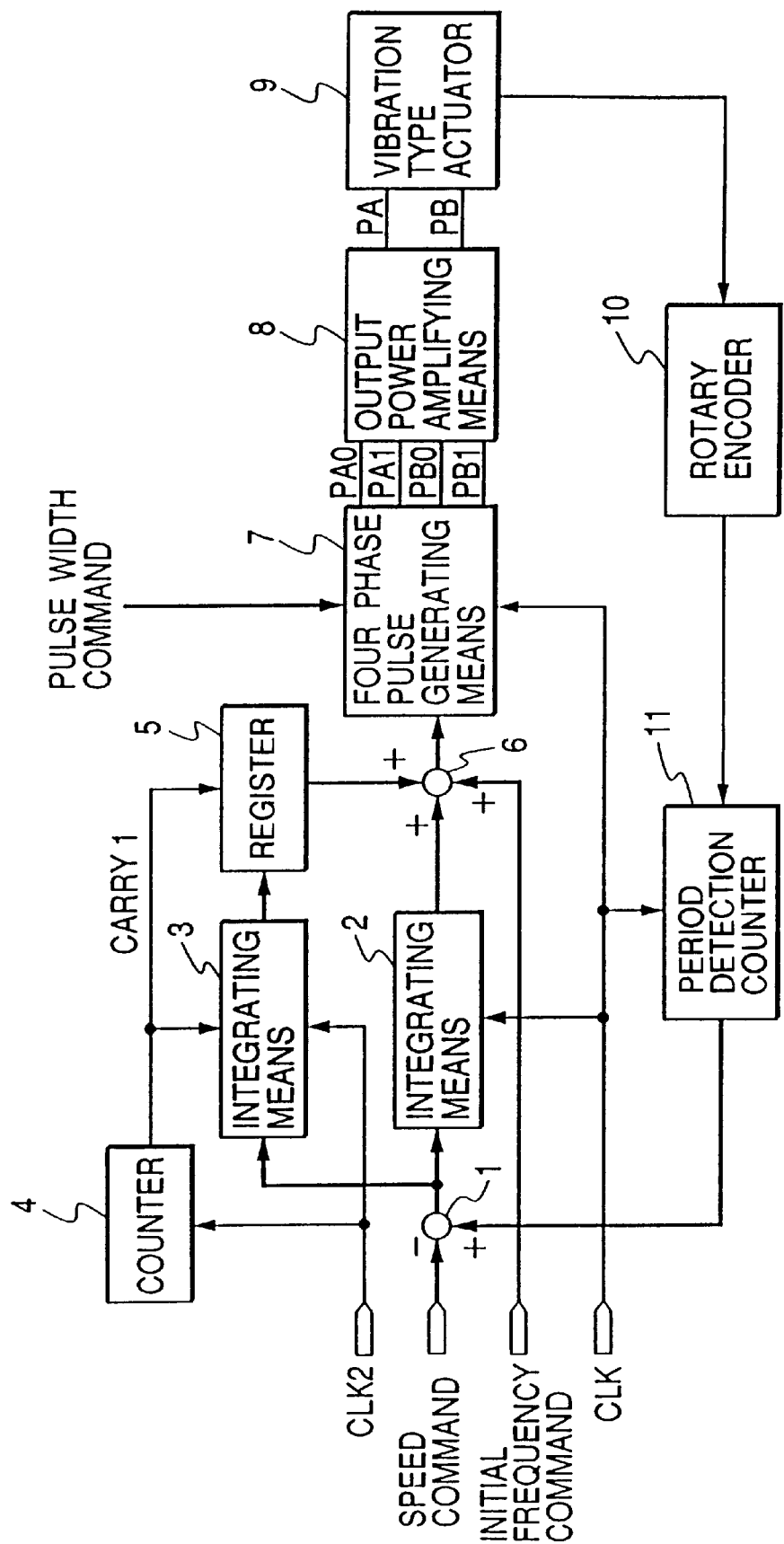
FIG. 17 is a block diagram showing the fifth embodiment of the present invention.

FIG. 17 is a block diagram showing the driving apparatus of a vibration type actuator according to the fifth embodiment of the present invention. A color image forming apparatus using the driving apparatus in FIG. 1 has the overall arrangement shown in FIG. 2.

Figure 18:
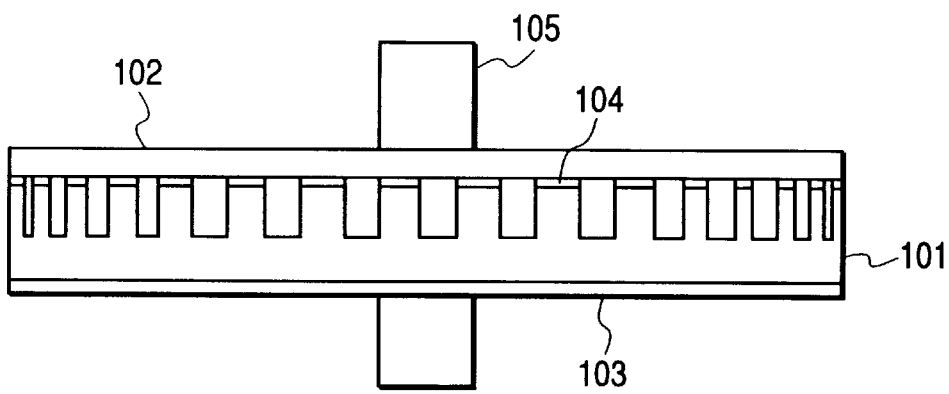
FIG. 18 is a side view of a vibration type actuator in FIG. 17.

FIG. 18 is a side view showing an annular actuator as an example of the vibration type actuator. The vibration member is constituted by adhering a piezoelectric element 103 serving as an electro-mechanical energy conversion element to one surface of an annular elastic element 101. The other surface opposite the surface to which the piezoelectric element 103 is adhered is used as a driving surface, and a rotor 102 having a rotating shaft (output shaft) 105 is in press contact with the driving surface by a press means (not shown). A friction member 104 is adhered to the driving surface of the elastic element 101 and interposed between the driving surface and the rotor 102.

Figure 19:
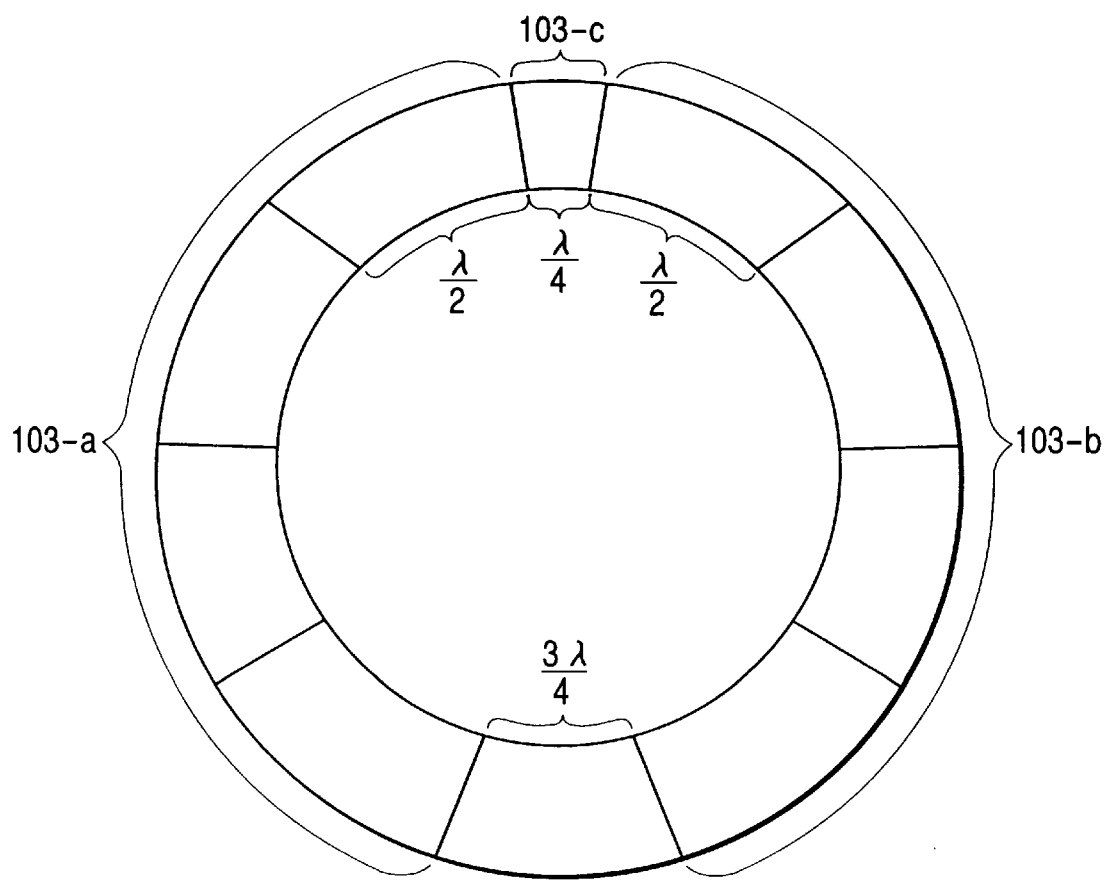
FIG. 19 is a plan view showing a piezoelectric element in FIG. 18.

The overall piezoelectric element 103 is annular, as shown in FIG. 19, and its surface is divided into a plurality of electrodes. These electrodes are composed of two driving electrode groups (103-a, 103-b) and one sensor electrode portion 103-c. The driving electrode group 103-a, driving electrode group 103-b, and sensor electrode portion 103-c will be respectively referred to as an A phase, B phase, and S phase.

In the vibration type actuator shown in FIG. 18, AC voltages having a time phase difference of 90° are applied to the A and B phases to generate a traveling vibration wave on the elastic element 101 (generate circular or elliptical movement on the surface of the elastic element 101). This vibration force is transferred by a frictional force to the rotor 102 in press contact with the elastic element 101 via the friction member 104, thereby rotating the rotor 102.

In this way, the vibration type actuator relatively rotates the rotor 102 and elastic element 101 by applying two AC voltages.

The driving apparatus of the vibration type actuator shown in FIG. 17 controls a vibration type actuator 9 to make its driving speed constant. A rotary encoder 10 detects the rotational speed of the vibration type actuator 9. A period detection counter 11 detects the period of a pulse signal from the rotary encoder. A subtracter 1 subtracts a speed command of a command means (not shown) from a value corresponding to the rotational speed of the vibration type actuator detected by the period detection counter 11. Integrating means 2 and 3 integrate an output from the subtracter 1.

A counter 4 generates a reset signal to the integrating means 3 at a predetermined timing. A register 5 holds, in accordance with a signal Carry1 from the counter 4, a value immediately before an output from the integrating means 3 is reset at the timing of the reset signal.

An adder 6 adds an integrating output from the integrating means 2, an output from the register 5, and an initial frequency command from the command means (not shown). A four phase pulse generating means 7 generates four phase pulses on the basis of a frequency command as an output from the adder 6 and a pulse width command from the command means (not shown). An output power amplifying means 8 outputs two phase AC voltages of about 0 V to 200 Vp-p in accordance with outputs from the four phase pulse generating means 7.

In operation of the block diagram of FIG. 17, when the rotational speed of the vibration type actuator 9 detected by the period detection counter 11 is lower than a command speed from the command means (not shown), an output from the periodic counter 11 is larger, and thus an output from the subtracter 1 is positive. Then, outputs from the integrating means 2 and 3 increase. When the outputs from the integrating means 2 and 3 are added by the adder 6 to an initial frequency command from the command means (not shown), the pulse period (frequency command) as a command to the four phase pulse generating means 7 increases, and the driving frequency of the vibration type actuator 9 decreases. Since the driving frequency comes near to the resonance frequency of the vibration type actuator 9, the rotational speed of the vibration type actuator increases to the command speed.

Figure 20:
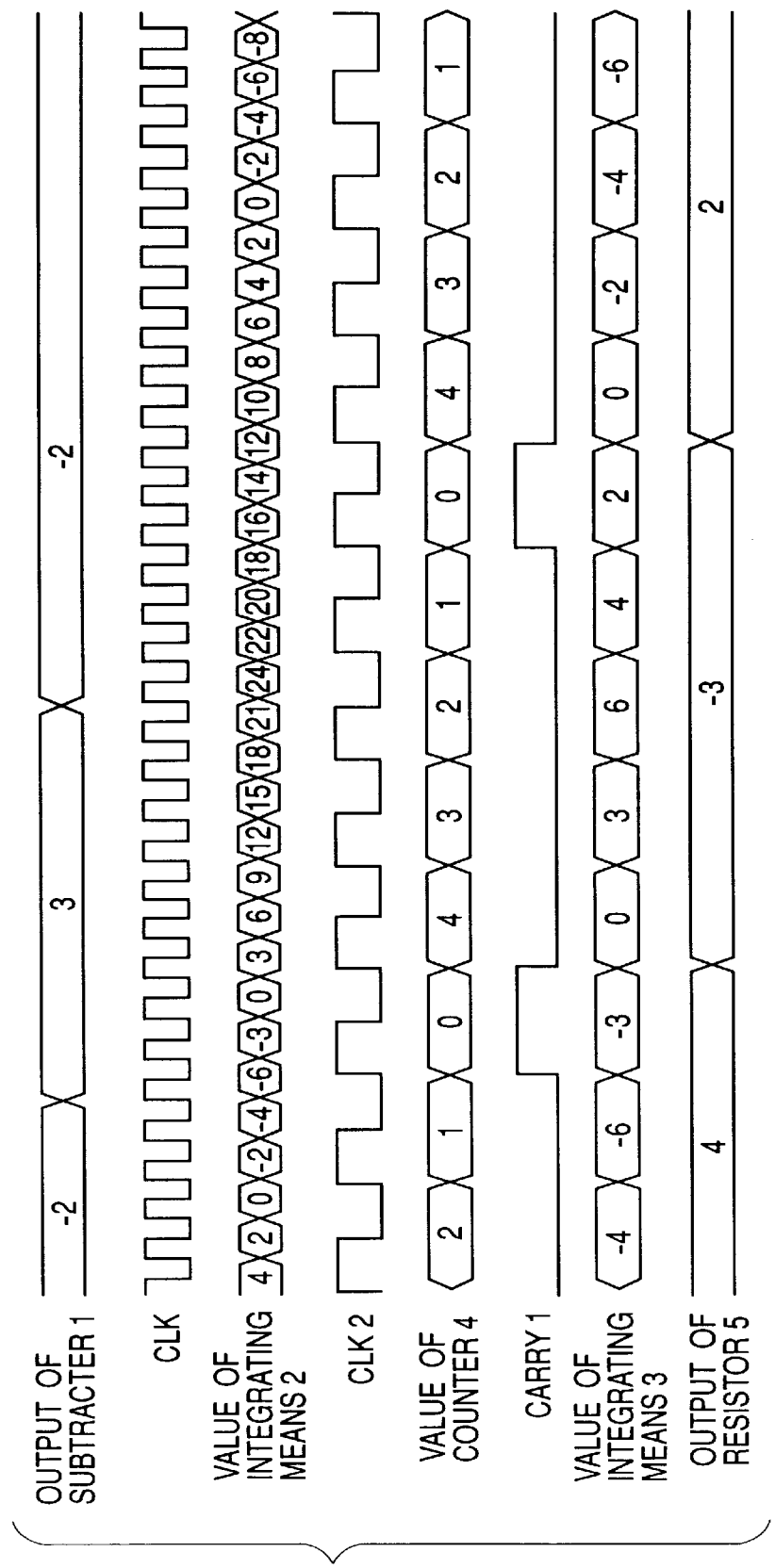
FIG. 20 is a timing chart showing operation of an integrating means, counter, and register in FIG. 17.

FIG. 20 is a timing chart showing operation of the integrating means 2 and 3 and counter 4. The integrating value of the integrating means 2 is obtained by integrating an output from the subtracter 1 at the timing of a signal CLK. The integrating value of the integrating means 3 is integrated at the timing of a signal CLK2.

The counter 4 outputs one signal Carry1 in five periods of the signal CLK2. The integrating means 3 is reset at the leading edge of the signal CLK2 when the signal Carry1 is at high level, and an integrating value immediately before the reset is held in the register 5.

Figure 21:
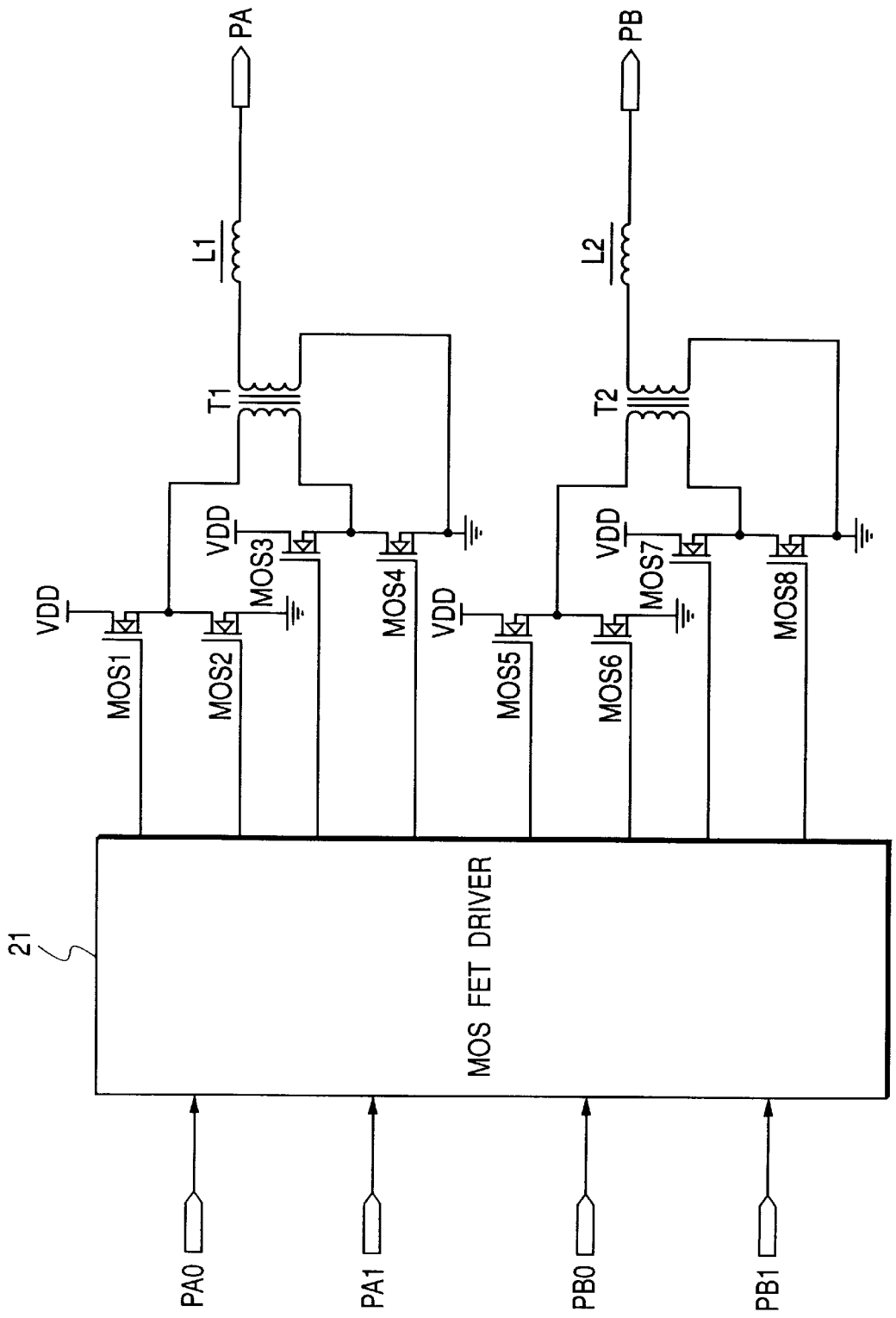
FIG. 21 is a block diagram showing an output power amplifying means in FIG. 17.

FIG. 21 is a block diagram showing an example of the output power amplifying means 8.

A MOSFET driver 21 drives a MOSFET. For example, the MOSFET driver 21 turns on MOS2 and turns off MOS1 if PA0 is at low level, and turns on MO1 and off MOS2 if PA0 is at high level. The MOSFET driver 21 boosts the driving voltage using transformers T1 and T2 and applies a high AC voltage to the vibration type actuator 9 via coils L1 and L2. The coils L1 and L2 match with the equivalent capacitances of the vibration type actuator.

In general, the vibration type actuator 9 is driven in a frequency range higher than the resonance frequency of a vibration member 101. The frequency is substantially matched within the driving frequency range. For example, the frequency matches with a frequency higher than the resonance frequency and lower than the antiresonance frequency, and the order of the vibration mode of the vibrator is set within the frequency range of the main driving mode.

Figure 22:
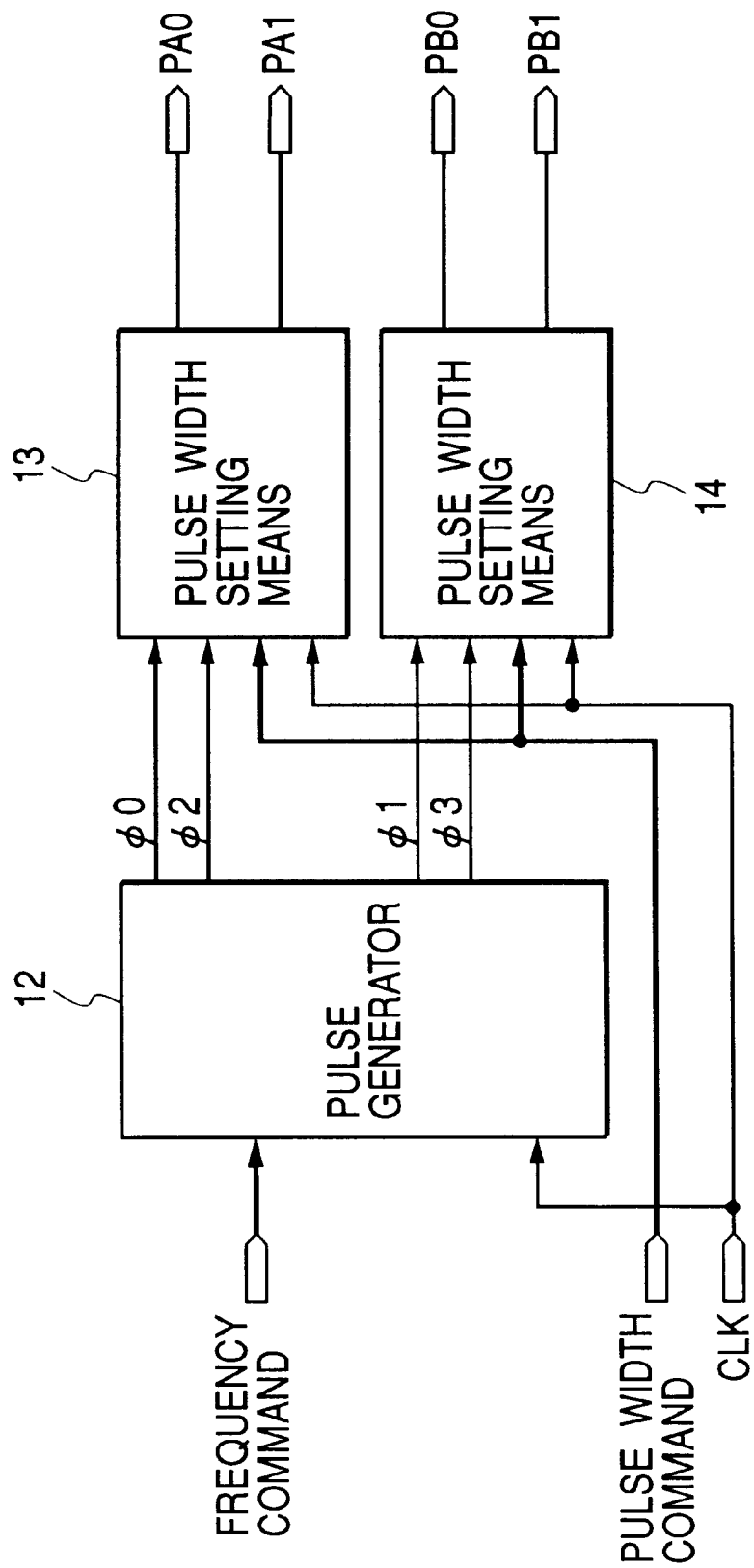
FIG. 22 is a block diagram showing a four phase pulse generating means in FIG. 17.

FIG. 22 is a block diagram showing the arrangement of the four phase pulse generating means 7. A pulse generator 12 generates four phase fixed pulse width signals on the basis of a frequency command. Pulse width setting means 13 and 14 change the pulse widths of fixed pulse width signals Φ0 to Φ3 from the pulse generator 12 on the basis of a pulse width command.

Figure 23:
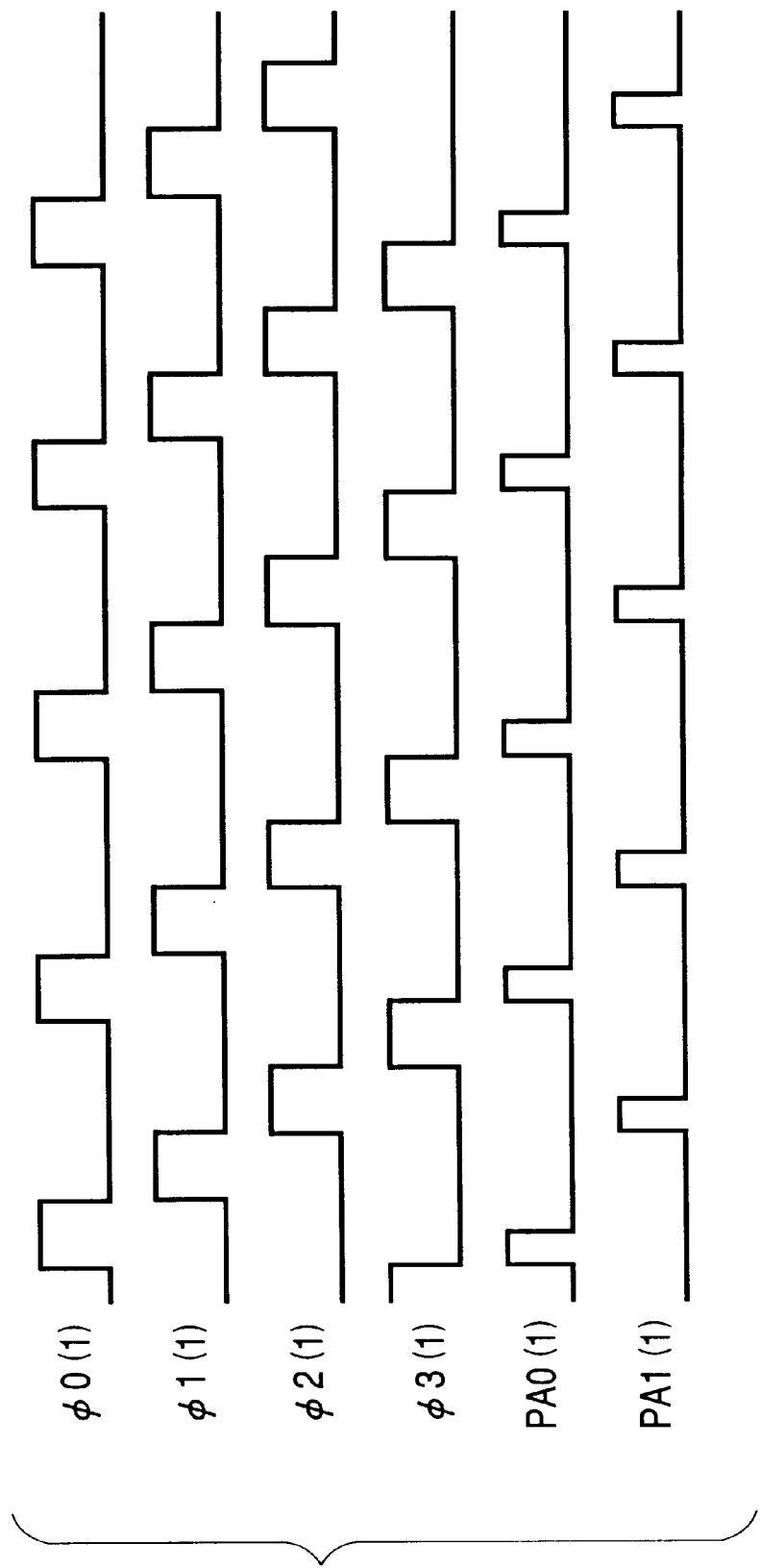
FIG. 23 is a timing chart showing operation in FIG. 22.

FIG. 23 is a timing chart showing an example of the waveforms of the respective units in FIG. 22. As is apparent from FIG. 23, Φ0 to Φ3 are sequentially output pulses having a duty of 25%, and PA0 and PA1 are output pulses whose duties are changed from 25%.

Figure 24:
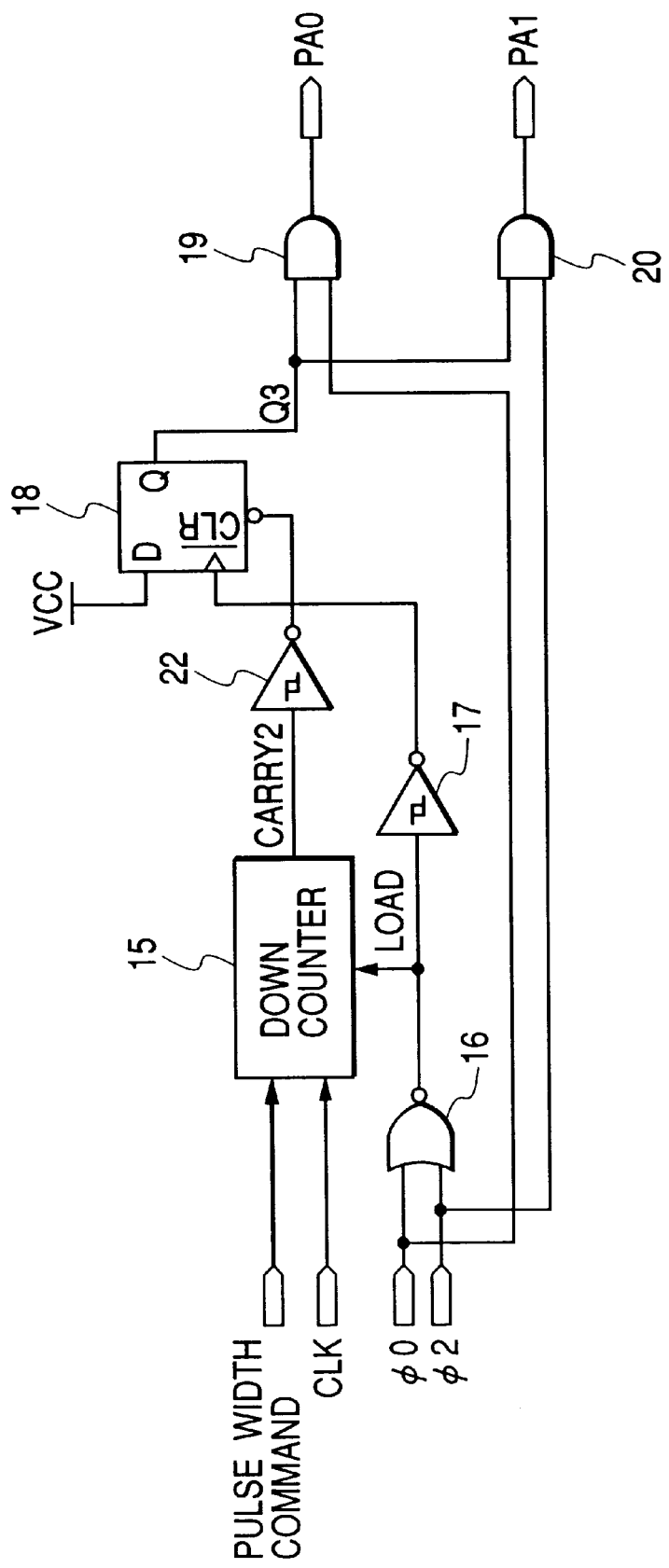
FIG. 24 is a block diagram showing a pulse width setting means in FIG. 22.

FIG. 24 is a circuit diagram showing a circuit example of the pulse width setting means 13. The pulse width setting means 13 comprises a down counter 15, a NOR element 16, NOT elements 17 and 22, a D flip-flop 18, and AND elements 19 and 20.

A pulse width command is loaded to the down counter 15 at the leading edge of the signal CLK when a signal Load is at high level. The counter value is decremented one by one at the leading edge of the signal CLK when the signal Load is at low level. When the counter value reaches 0, a signal Carry2 changes to high level and is inverted by the NOT element 22 to reset the D flip-flop 18.

Figure 25:
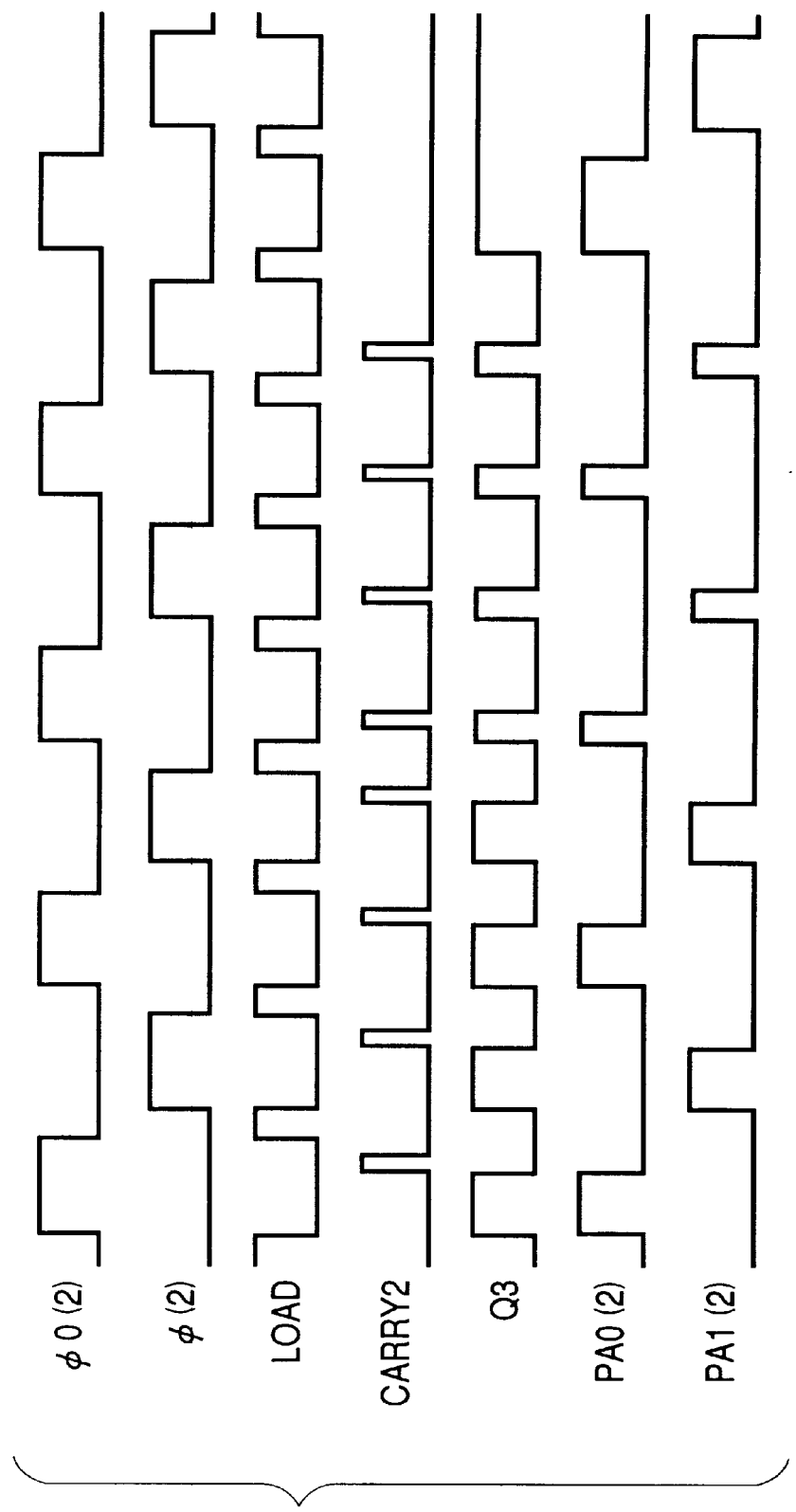
FIG. 25 is a timing chart showing operation in FIG. 24.

FIG. 25 is a timing chart showing an example of the waveforms of the respective units. Unlike an example of FIG. 23, Φ0 and Φ2 have a duty of 37.5%. The pulse width of the signal PA0 is limited by the signal Carry2, and the pulse width of Φ0 is changed.

In the fifth embodiment, the rotational speed of the vibration type actuator 9 is controlled by changing its driving frequency. Instead, the rotational speed can also be controlled by controlling the magnitude of the driving voltage, similar to the driving frequency, because the rotational speed is higher for a larger driving voltage. Further, the rotational speed can be controlled by controlling the phase difference between PA and PB.

As described above, FIG. 20 is a timing chart showing operation of the integrating means 2 and 3 and register 5. The integrating means 2 integrates an output from the subtracter 1 at the timing of the signal CLK, whereas the integrating means 3 integrates an output from the subtracter 1 at the timing of the CLK2. The integrating means 3 is reset in a predetermined period, i.e., every 5 pulses of the signal CLK2, and a value immediately before resetting is set in the register 5. Since an integrating value is set in the register 5 every time an output from the subtracter 1 is integrated four times, if the output from the subtracter 1 does not change, a value four times the output value is set in the register 5.

More specifically, proportional integral control of the speed can be attained by adding the values of the integrating means 2 and register 5 to an initial frequency command by the adder 6.

Note that in the fifth embodiment, the vibration type actuator 9 is applied to driving of the photosensitive drum in the color image forming apparatus. However, the vibration type actuator 9 may also be applied to reciprocal operation of the print head carriage of the printer, driving of the magnetic disk head of the hard disk, driving of the pan head of the camera, and the like.

In addition, a control circuit as shown in FIG. 17 is arranged for each photosensitive drum.

In the fifth embodiment, the speed of the vibration type actuator is changed by changing the driving frequency. As is well known, the speed is higher for a higher driving voltage, and lower when the phase difference between the A and B phases comes near to 0°. Accordingly, these parameters may be changed instead of the frequency.

Sixth Embodiment

Figure 26:
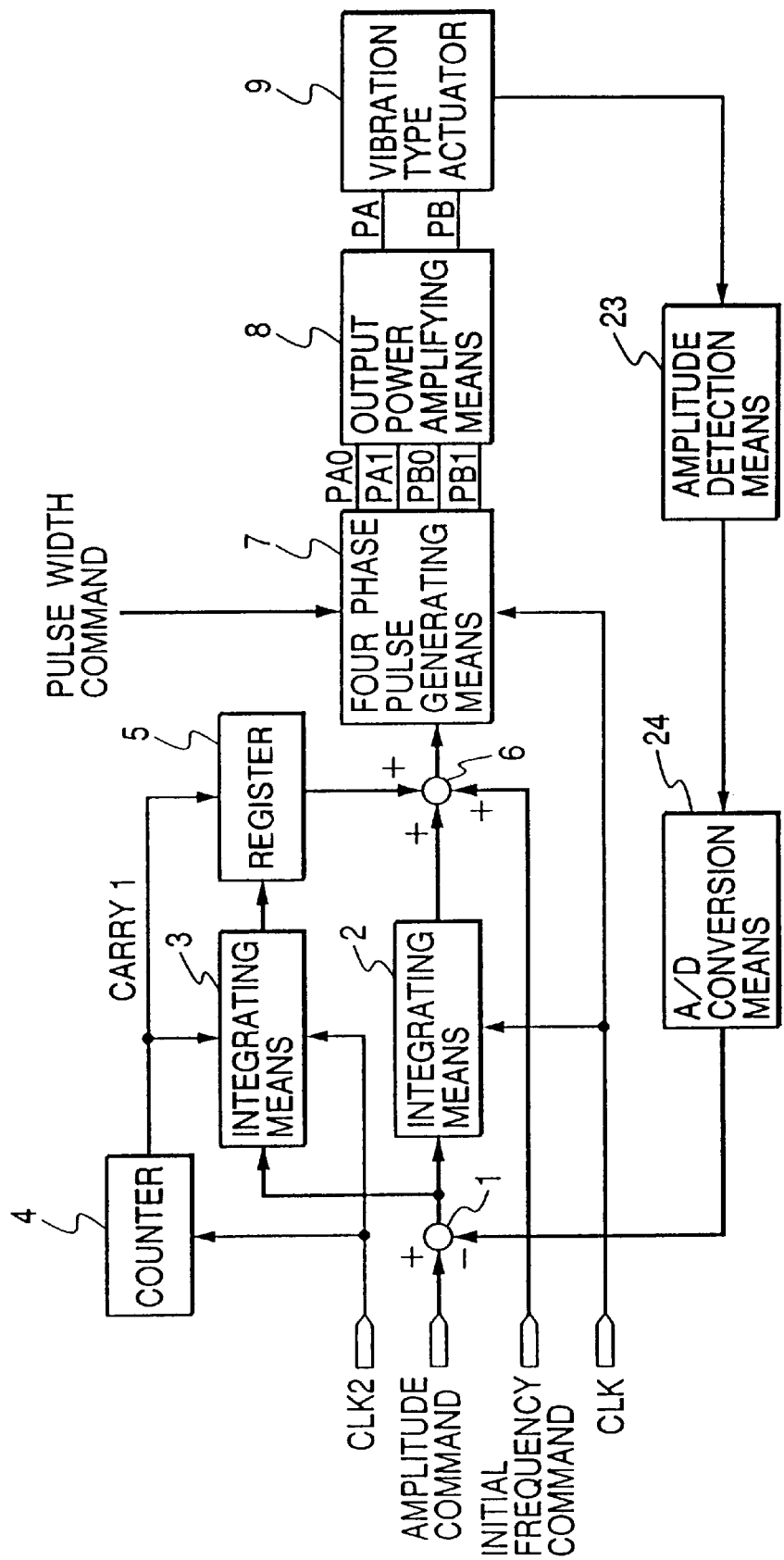
FIG. 26 is a block diagram showing the sixth embodiment of the present invention.

FIG. 26 is a block diagram showing the control apparatus of a vibration type actuator according to the sixth embodiment of the present invention. The vibration amplitude of a vibration type actuator 9 is controlled to coincide with an amplitude command from a command means (not shown).

In FIG. 26, an amplitude detection means 23 detects the amplitude on the basis of a signal from a sensor electrode (S phase) for detecting the vibration of the vibration type actuator 9. An A/D conversion means 24 A/D-converts an output voltage from the amplitude detection means 23.

Operation of the sixth embodiment will be described.

When the vibration amplitude of the vibration type actuator 9 detected by the A/D conversion means 24 is smaller than an amplitude command from the command means (not shown), an output from the A/D conversion means 24 is smaller, and an output from a subtracter 1 is positive. Then, outputs from integrating means 2 and 3 increase. When the outputs from the integrating means 2 and 3 are added by an adder 6 to an initial frequency command from the command means (not shown), the pulse period (frequency command) as a command to a four phase pulse generating means 7 increases, and the driving frequency of the vibration type actuator 9 decreases. Since the driving frequency comes near to the resonance frequency of the vibration type actuator 9, the rotational speed of the vibration type actuator 9 increases to the amplitude command.

Seventh Embodiment

Figure 27:
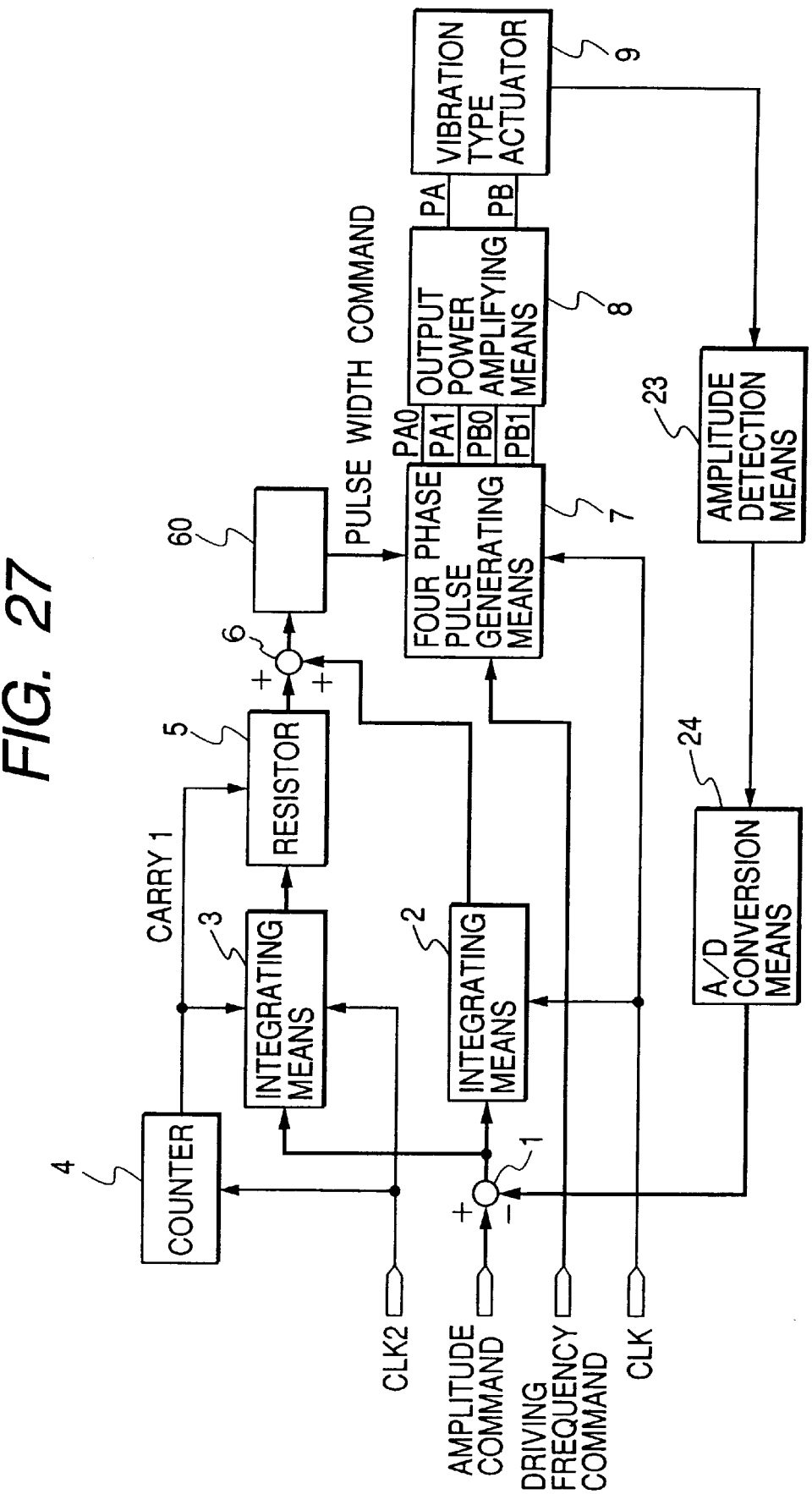
FIG. 27 is a block diagram showing the seventh embodiment of the present invention.

FIG. 27 is a block diagram showing the control apparatus of a vibration type actuator according to the seventh embodiment of the present invention. In the sixth embodiment, the driving frequency is changed to change the vibration amplitude. In the seventh embodiment, however, the amplitude of the driving voltage is changed.

The four phase pulse generating means 7 in the sixth embodiment is determined by a driving frequency command from an output of the adder 6, and receives a pulse width command from the command means (not shown). In the seventh embodiment, a four phase pulse generating means 7 receives a pulse width command from an adder 6. When an output from the adder 6 is negative, a limit means 60 outputs 0; when it is positive, the limit means 60 directly outputs the positive output.

Operation of the seventh embodiment will be described. When the vibration amplitude of a vibration type actuator 9 detected by an A/D conversion means 24 is larger than an amplitude command from a command means (not shown), an output from the A/D conversion means 24 is larger, and an output from a subtracter 1 is negative. Then, outputs from integrating means 2 and 3 decrease. When the outputs from the integrating means 2 and 3 are added by the adder 6, a pulse width command to the four phase pulse generating means 7 decreases, and an output voltage from an output power amplifying means 8 also decreases. Consequently, the amplitude of the vibration type actuator 9 decreases near to the amplitude command.

What is claimed is:

1. A driving apparatus for a vibration type actuator that obtains a driving force by applying a periodic signal to an electro-mechanical energy conversion element so as to generate a vibration on a vibration member of the vibration type actuator, said driving apparatus, comprising:

detection means for detecting a driving state of the vibration type actuator;

calculation means for calculating a value corresponding to a difference between the driving state detected by said detection means and a predetermined state;

first integral means for integrating the value calculated by said calculation means;

second integral means for integrating a value obtained from said first integral means; and an adjustment circuit for adjusting an energy amount supplied to the electro-mechanical energy conversion element in accordance with at least a value obtained from said second integral means.

2. A driving apparatus according to claim 1, further comprising:

addition means for adding the value obtained from said first integral means and the value obtained from said second integral means, wherein said adjustment circuit adjusts the energy amount supplied to the electro-mechanical energy conversion element in accordance with an output from said addition means.

3. A driving apparatus according to claim 1, further comprising:

proportional means for calculating a value which is proportional to the value calculated by said calculation means; and addition means for adding the value obtained from said first integral means, the value obtained from said second integral means and the value obtained from said proportional means, wherein said adjustment circuit adjusts the energy amount supplied to the electro-mechanical energy conversion element in accordance with an output from said addition means.

4. A driving apparatus according to claim 1, wherein said detection means detects any one of a speed, acceleration, position, and vibration state of said vibration type actuator.

5. A driving apparatus according to claim 1, wherein said adjustment circuit changes a frequency of the periodic signal applied to the electro-mechanical energy conversion element.

6. A driving apparatus according to claim 1, wherein said adjustment circuit changes a voltage amplitude of the periodic signal applied to the electro-mechanical energy conversion element.

7. A driving apparatus according to claim 1, wherein said adjustment circuit changes phases of a plurality of periodic signals applied to the electro-mechanical energy conversion element.

8. A device which has a vibration type actuator that obtains a driving force by applying a periodic signal to an electro-mechanical energy conversion element so as to generate a vibration on a vibration member of the vibration type actuator, and which drives a member to be driven by said vibration type actuator, comprising:

detection means for detecting a driving state of the vibration type actuator;

calculation means for calculating a value corresponding to a difference between the driving state detected by said detection means and a predetermined state;

first integral means for integrating the value calculated by said calculation means;

second integral means for integrating a value obtained from said first integral means; and an adjustment circuit for adjusting an energy amount supplied to the electro-mechanical energy conversion element in accordance with at least a value obtained from said second integral means.

9. A device according to claim 8, further comprising:

addition means for adding the value obtained from said first integral means and the value obtained from said second integral means, wherein said adjustment circuit adjusts the energy amount supplied to the electro-mechanical energy conversion element in accordance with an output from said addition means.

10. A device according to claim 8, further comprising:

proportional means for calculating a value which is proportional to the value calculated by said calculation means; and addition means for adding the value obtained from said first integral means, the value obtained from said second integral means, and the value obtained from said proportional means, wherein said adjustment circuit adjusts the energy amount supplied to the electro-mechanical energy conversion element in accordance with an output from said addition means.

11. A device according to claim 8, wherein said detection means detects any one of a speed, acceleration, position, and vibration state of said vibration type actuator.

12. A device according to claim 8, wherein said adjustment circuit changes a frequency of the periodic signal applied to the electro-mechanical energy conversion element.

13. A device according to claim 8, wherein said adjustment circuit changes a voltage amplitude of the periodic signal applied to the electro-mechanical energy conversion element.

14. A device according to claim 8, wherein said adjustment circuit changes phases of a plurality of periodic signals applied to the electro-mechanical energy conversion element.

15. An image forming apparatus using, as a driving source, a vibration type actuator that obtains a driving force by applying a periodic signal to an electro-mechanical energy conversion element so as to generate a vibration on a vibration member of the vibration type actuator, said image forming apparatus comprising:

a driving control circuit unit having detection means for detecting a driving state of the vibration type actuator, calculation means for calculating a value corresponding to a difference between the driving state obtained from said detection means and a predetermined state, first integral means for integrating the value calculated by said calculation means, second integral means for integrating a value obtained from said first integral means, and an adjustment circuit for adjusting an energy amount supplied to the electro-mechanical energy conversion element in accordance with at least a value obtained from said second integral means.

16. An image forming apparatus according to claim 15, further comprising:

addition means for adding the value obtained from said first integral means and the value obtained from said second integral means, wherein said adjustment circuit adjusts the energy amount supplied to the electro-mechanical energy conversion element in accordance with an output from said addition means.

17. An image forming apparatus according to claim 15, further comprising:

proportional means for calculating a value which is proportional to the value obtained from said calculation means; and addition means for adding the value obtained from said first integral means, the value obtained from said second integral means and the value obtained from said proportional means, wherein said adjustment circuit adjusts the energy amount supplied to the electro-mechanical energy conversion element in accordance with an output from said addition means.

18. An image forming apparatus according to claim 15, wherein said detection means detects any one of a speed, acceleration, position, and vibration state of said vibration type actuator.

19. An image forming apparatus according to claim 15, wherein said adjustment circuit changes a frequency of the periodic signal applied to the electro-mechanical energy conversion element.

20. An image forming apparatus according to claim 15, wherein said adjustment circuit changes a voltage amplitude of the periodic signal applied to the electro-mechanical energy conversion element.

21. An image forming apparatus according to claim 15, wherein said adjustment circuit changes phases of a plurality of periodic signals applied to the electro-mechanical energy conversion element.

22. An image forming apparatus according to claim 15, further comprising:

a plurality of vibration type actuators; and a respective plurality of driving control circuit units for said plurality of vibration type actuators.

23. A driving apparatus for a vibration type actuator that obtains a driving force by applying a periodic signal to an electro-mechanical energy conversion element so as to generate a vibration on a vibration member of the vibration type actuator, said driving apparatus comprising:

detection means for detecting a driving state of the vibration type actuator;

calculation means for calculating a difference between the driving state detected by said detection means and a predetermined state;

first integrating means for integrating a value output from said calculation means at a first timing;

second integrating means for integrating the value output from said calculation means at a second timing, and in which an integrating value is reset every predetermined number of integrating operations;

a register for holding an integration value of said second integrating means immediately before resetting said second integrating means each time;

addition means for adding values output from said first integrating means and said register; and an adjustment circuit for adjusting an energy amount supplied to the electro-mechanical energy conversion element in accordance with an output from said addition means.

24. A driving apparatus according to claim 23, wherein said adjustment circuit changes a phase difference between a plurality of periodic signals applied to the electro-mechanical energy conversion element.

25. A driving apparatus according to claim 23, wherein said detection means detects any one of a speed, acceleration, position, and vibration state of said vibration type actuator.

26. A driving apparatus according to claim 23, wherein said adjustment circuit changes a frequency of the periodic signal applied to the electro-mechanical energy conversion element.

27. A driving apparatus according to claim 23, wherein said adjustment circuit changes either one of a voltage amplitude of the periodic signal applied to the electro-mechanical energy conversion element and a value capable of changing the voltage amplitude.

28. An image forming apparatus using, as a driving source, a vibration type actuator that obtains a driving force by applying a periodic signal to an electro-mechanical energy conversion element so as to generate a vibration on a vibration member of the vibration type actuator, said image forming apparatus comprising:

a driving control circuit unit comprising:

detection means for detecting a driving state of the vibration type actuator, calculation means for calculating a difference between the driving state detected by said detection means and a predetermined state, first integrating means for integrating a value output from said calculation means at a first timing, second integrating means for integrating the value output from said calculation means at a second timing, and in which an integrating value is reset every predetermined number of integrating operations, a register for holding an integration value of said second integrating means immediately before resetting said second integrating means each time, addition means for adding values output from said first integrating means and said register, and an adjustment circuit for adjusting an energy amount supplied to the electro-mechanical energy conversion element in accordance with an output from said addition means.

29. An image forming apparatus according to claim 28, wherein said adjustment circuit changes a phase difference between a plurality of periodic signals applied to the electro-mechanical energy conversion element.

30. An image forming apparatus according to claim 28, further comprising:

a plurality of vibration type actuators; and a respective plurality of driving control circuit units for said plurality of vibration type actuators.

31. An image forming apparatus according to claim 28, wherein said detection means detects any one of a speed, acceleration, position, and vibration state of said vibration type actuator.

32. An image forming apparatus according to claim 28, wherein said adjustment circuit changes a frequency of the periodic signal applied to the electro-mechanical energy conversion element.

33. An image forming apparatus according to claim 28, wherein said adjustment circuit changes either one of a voltage amplitude of the periodic signal applied to the electro-mechanical energy conversion element and a value capable of changing the voltage amplitude.

* * * * *

UNITED STATES PATENT AND TRADEMARK OFFICE
CERTIFICATE OF CORRECTION

PATENT NO. : 6,100,622

DATED : August 8, 2000

INVENTOR(S) : SHINJI YAMAMOTO, ET AL.

Page 1 of 2

It is certified that error appears in the above-identified patent and that said Letters Patent is hereby corrected as shown below:

Sheet 4

Figure 5:
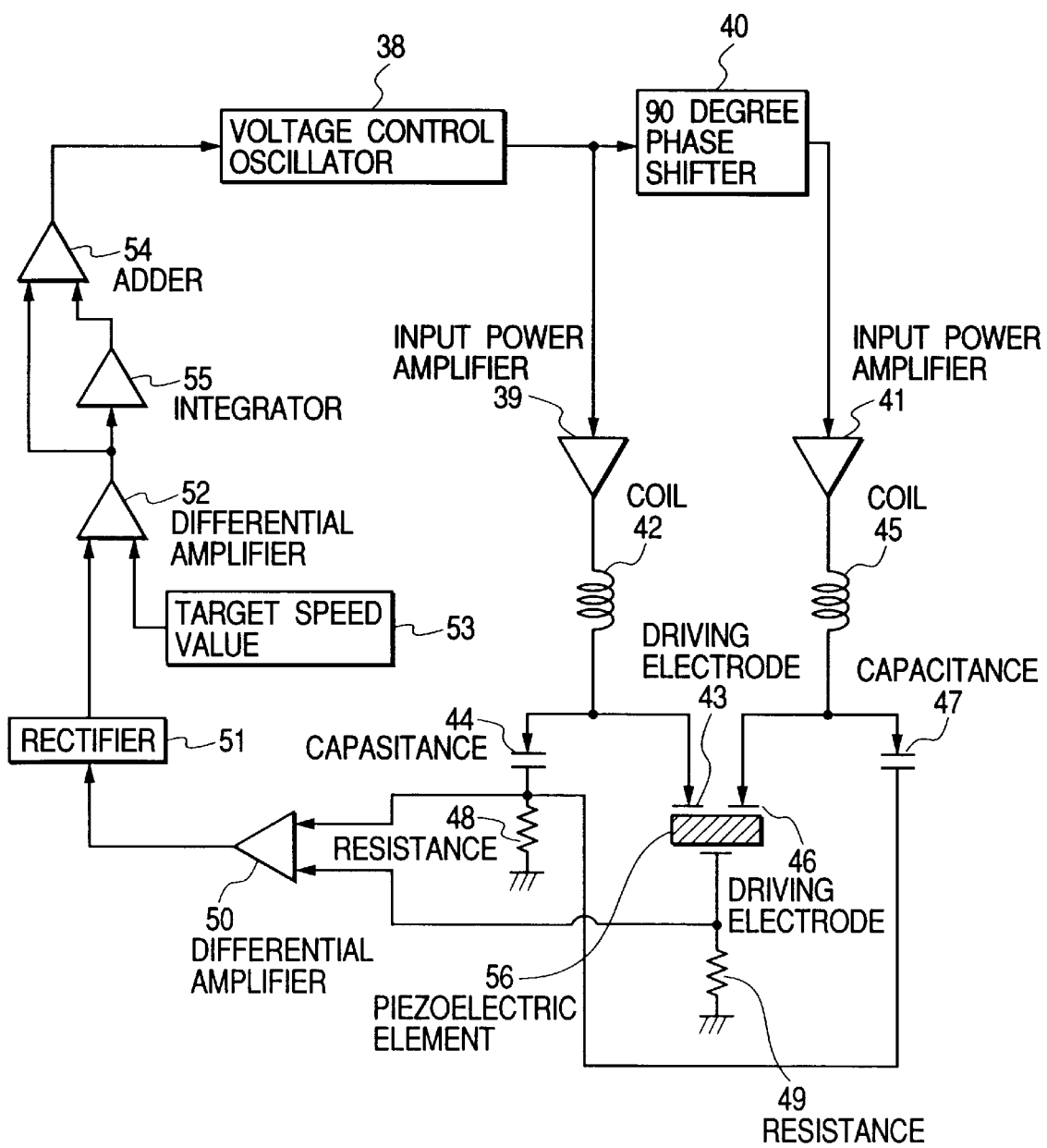
FIG. 5 is a block diagram showing control of a conventional vibration type actuator.

Figure 5, "CAPASITANCE" should read --CAPACITANCE--.

Column 1

Line 59, "points,." should read --points,--.

Column 2

Line 6, "analog" should read --analog,--.

Column 5

Line 63, "pulse" should be deleted.
    Line 64, "clock." should read --clock pulse.--.

Column 6

Line 22, "Qof" should read --Q of --.

UNITED STATES PATENT AND TRADEMARK OFFICE
CERTIFICATE OF CORRECTION

PATENT NO. : 6,100,622
DATED : August 8, 2000
INVENTOR(S) : SHINJI YAMAMOTO, ET AL.

It is certified that error appears in the above-identified patent and that said Letters Patent is hereby corrected as shown below:

Column 11

Line 22, "not" should read --(not--; and "embodiment;" should read --embodiment)--.

Column 14

Line 35, "off" should read --turns off--.

Column 16

Line 49, "apparatus, comprising" should read --apparatus comprising--.

Signed and Sealed this

Twenty-fourth Day of April, 2001

Attest:

NICHOLAS P. GODICI

Attesting Officer

Acting Director of the United States Patent and Trademark Office